United States Patent
Jeong et al.

(10) Patent No.: US 9,510,230 B2
(45) Date of Patent: Nov. 29, 2016

(54) METHOD AND APPARATUS FOR CONTROLLING USER EQUIPMENT ACCESS IN MOBILE COMMUNICATION SYSTEM

(71) Applicants: Samsung Electronics Co., Ltd., Suwon-si, Gyeonggi-do (KR); INDUSTRY-ACADEMIC COOPERATION FOUNDATION, YONSEI UNIVERSITY, Seoul (KR)

(72) Inventors: Sang-Soo Jeong, Suwon-si (KR); Song-Yean Cho, Seoul (KR); Seong-Lyun Kim, Seoul (KR); Beom-Sik Bae, Suwon-si (KR); Sang-Hoon Lee, Ansan-si (KR); Hyun-Kwan Lee, Seoul (KR); Beom-Hee Lee, Seoul (KR); Min-Cheol Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 197 days.

(21) Appl. No.: 14/349,986

(22) PCT Filed: Oct. 4, 2012

(86) PCT No.: PCT/KR2012/008011
§ 371 (c)(1),
(2) Date: Jun. 3, 2014

(87) PCT Pub. No.: WO2013/051845
PCT Pub. Date: Apr. 11, 2013

(65) Prior Publication Data
US 2014/0313889 A1    Oct. 23, 2014

(30) Foreign Application Priority Data
Oct. 4, 2011    (KR) .................. 10-2011-0100775

(51) Int. Cl.
*H04W 36/24* (2009.01)
*H04W 28/02* (2009.01)
(Continued)

(52) U.S. Cl.
CPC ....... *H04W 28/0284* (2013.01); *H04W 76/028* (2013.01); *H04W 76/04* (2013.01)

(58) Field of Classification Search
USPC ..................................... 370/230
See application file for complete search history.

(56) References Cited

U.S. PATENT DOCUMENTS 8,488,585 B2 * 7/2013 Shimizu .............. H04W 76/028
370/216
2007/0253412 A1    11/2007 Batteram et al.
(Continued)

FOREIGN PATENT DOCUMENTS

CN      102 111 847 A    6/2011
KR    10-2009-0038558 A    4/2009
(Continued)

*Primary Examiner* — Omar Ghowrwal
*Assistant Examiner* — Angel Brockman
(74) *Attorney, Agent, or Firm* — Jefferson IP Law, LLP

(57) ABSTRACT

A method for a Mobility Management Entity (MME) to control a connection of a User Equipment (UE) in a mobile communication system is provided. The method includes a first standby method including an MME in a wireless communication system that includes predicting an overload durating time when an overload duration time that is predicted, transmitting to an enhanced Node B (eNodeB) information on the reconnection method of the UE that is decided, wherein the plurality of reconnection methods represent methods for the UE attempting reconnection with the MME after a second standby time that is longer than the first standby time, and an MME reselection method for the UE attempting the reconnection with an MME which is different from the MME.

17 Claims, 12 Drawing Sheets

(51) Int. Cl.
*H04W 76/04* (2009.01)
*H04W 76/02* (2009.01)

(56) References Cited

U.S. PATENT DOCUMENTS

| | | | |
|---|---|---|---|
| 2009/0097454 A1 | 4/2009 | Yeou et al. | |
| 2009/0318161 A1* | 12/2009 | Lopes | H04W 28/08 455/453 |
| 2010/0293275 A1* | 11/2010 | Rezaiifar | H04L 12/5695 709/225 |
| 2011/0199898 A1 | 8/2011 | Cho et al. | |
| 2013/0045738 A1* | 2/2013 | Chen | H04W 76/027 455/433 |
| 2013/0279330 A1 | 10/2013 | Feng et al. | |
| 2014/0024368 A1* | 1/2014 | Jin | H04W 8/02 455/433 |

FOREIGN PATENT DOCUMENTS

| | | |
|---|---|---|
| KR | 10-2010-0085360 A | 7/2010 |
| KR | 10-2011-0072478 A | 6/2011 |
| KR | 10-2011-0094408 A | 8/2011 |
| WO | 2009/096833 A1 | 8/2009 |
| WO | 2011/070041 A | 6/2011 |

* cited by examiner

METHOD AND APPARATUS FOR CONTROLLING USER EQUIPMENT ACCESS IN MOBILE COMMUNICATION SYSTEM

CROSS-REFERENCE TO RELATED APPLICATION(S)

This application is a U.S. National Stage application under 35 U.S.C. §371 of an International application filed on Oct. 4, 2012 and assigned application number PCT/KR2012/008011, and claims the benefit of a Korean patent application filed on Oct. 4, 2011 in the Korean Intellectual Property Office and assigned Serial number 10-2011-0100775, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) INDUSTRY-ACADEMIC COOPERATION FOUNDATION, YONSEI UNIVERSITY.

TECHNICAL FIELD

The present disclosure relates to a mobile communication system. More particularly, the present disclosure relates to a method and an apparatus for controlling a connection of a User Equipment (UE) in a mobile communication system.

BACKGROUND

In a mobile communication system, an overload may occur due to information generated when a plurality of User Equipments (UEs) connects to a Mobility Management Entity (MME) and transceives signals. To reduce the overload, a process of blocking connections of new UEs may be executed in the mobile communication system. For example, in the mobile communication system of the related art, an MME transmits an overload start message to an evolved Node B (eNodeB) so as to block a Radio Resource Control (RRC) connection of a UE. The 3rd Generation Partnership Project (3GPP) has provided the following five schemes to block a connection of a UE:

1. Block RRC connections for data transmission of all UEs excluding an emergency terminal.
2. Block RRC connections of all UEs for signaling.
3. Allow the RRC connection for data transmission of an emergency terminal and a network.
4. Allow the RRC connection for data transmission of a UE having a high priority and a network.
5. Block RRC connection of a delay tolerant UE (delay tolerant traffic).

When the five schemes described above are utilized, an overload on the MME may be relieved but it may be difficult to secure a Quality of Service (QoS) of the UEs which have had their connection blocked.

Therefore, a need exists for a connection control method for reducing overload, and, simultaneously, secure a QoS of UEs which have had their connection blocked.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for controlling a connection of a User Equipment (UE) in a mobile communication system.

Another aspect of the present disclosure is to provide a method and an apparatus for controlling a connection of a UE based on a length of an overload duration when an overload occurs in a mobile communication system.

Another aspect of the present disclosure is to provide a method and an apparatus for reducing a connection time of a UE and decreasing the probability of an overload through load balancing among Mobility Management Entities (MMES) in a mobile communication system.

In accordance with an aspect of the present disclosure, a method for an MME to control a connection of a UE in a mobile communication system is provided. The method includes predicting a length of an overload duration when an overload occurs, determining one of a plurality of reconnection types to be a reconnection type of the UE, based on the predicted length of the overload duration, and transmitting, to an evolved Node B (eNodeB), information associated with the determined reconnection type of the UE, wherein the plurality of reconnection types includes a first wait time type in which the UE attempts reconnection to the MME after a first waiting time set in advance, a second wait time type in which the UE attempts reconnection to the MME after a second waiting time which is longer than the first waiting time, and an MME reselection type in which the UE attempts connection to another MME that is different from the MME.

In accordance with another aspect of the present disclosure, a method for an eNodeB to control a connection of a UE in a mobile communication system is provided. The method includes receiving information associated with a reconnection type of the UE from an MME in which an overload occurs, and including the information associated with the reconnection type of the UE in a connection request reject message and transmitting the connection request reject message to the UE when a first connection request message is received from the UE, wherein the reconnection type of the UE is one of a first wait time type in which the UE attempts reconnection to the MME after a first waiting time set in advance, a second wait time type in which the UE attempts reconnection to the MME after a second waiting time which is longer than the first waiting time, and an MME reselection type in which the UE attempts connection to another MME that is different from the MME.

In accordance with another aspect of the present disclosure, an MME connection method for a UE to connect to an MME in a mobile communication system is provided. The method includes transmitting a first connection request message to an eNodeB, and receiving a connection request reject message including information associated with a reconnection type of the UE from the eNodeB, and connecting to the MME or another MME that is different from the MME, based on the reconnection type of the UE included in the connection request reject message, wherein the reconnection type of the UE is one of a first wait time type in which the UE attempts reconnection to the MME after a first waiting time, a second wait time type in which the UE attempts reconnection to the MME after a second waiting time which is longer than the first waiting time, and an MME reselection type in which the UE attempts connection to another MME that is different from the MME.

In accordance with another aspect of the present disclosure, an MME in a mobile communication system is provided. The MME includes a controller configured to predict a length of an overload duration when an overload occurs and to determine one of a plurality of reconnection types to be a reconnection type of a UE, based on the predicted length of the overload duration, and a transmitting unit configured to transmit, to an eNodeB, information associated with the determined reconnection type of the UE, wherein the plurality of reconnection types includes a first wait time type in which the UE attempts reconnection to the MME after a first waiting time set in advance, a second wait time type in which the UE attempts reconnection to the MME after a second waiting time which is longer than the first waiting time, and an MME reselection type in which the UE attempts connection to another MME that is different from the MME.

In accordance with another aspect of the present disclosure, an eNodeB in a mobile communication system is provided. The eNodeB includes a transmitting unit, a receiving unit, and a controller configured to control the receiving unit to receive information associated with a reconnection type of a UE from an MME in which an overload occurs, and to control the transmitting unit to include the information associated with the reconnection type of the UE in a connection request reject message and to transmit the connection request reject message to the UE when a first connection request message is received from the UE, wherein the reconnection type of the UE is one of a first wait time type in which the UE attempts reconnection to the MME after a first waiting time set in advance, a second wait time type in which the UE attempts reconnection to the MME after a second waiting time which is longer than the first waiting time, and an MME reselection type in which the UE attempts connection to another MME that is different from the MME.

In accordance with another aspect of the present disclosure, a UE in a mobile communication system is provided. The UE includes a transmitting unit, a receiving unit, and a controller configured to control the transmitting unit to transmit a first connection request message to an eNodeB, and to receive a connection request reject message including information associated with a reconnection type of the UE from the eNodeB through the receiving unit, and connects to an MME or another MME that is different from the MME, based on the reconnection type of the UE included in the connection request reject message, wherein the reconnection type of the UE is one of a first wait time type in which the UE attempts reconnection to the MME after a first waiting time, a second wait time type in which the UE attempts reconnection to the MME after a second waiting time which is longer than the first waiting time, and an MME reselection type in which the UE attempts connection to another MME that is different from the MME.

According to various embodiments of the present disclosure, when an overload occurs in a mobile communication system, one of a plurality of connection types of a UE may be used based on a length of an overload duration and, thus, the connection of the UE may be effectively controlled.

According to various embodiments of the present disclosure, a connection time of a UE that connects to an MME where an overload occurs may be reduced, and the number of overloads occurring may be decreased by balancing the load of the MMEs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
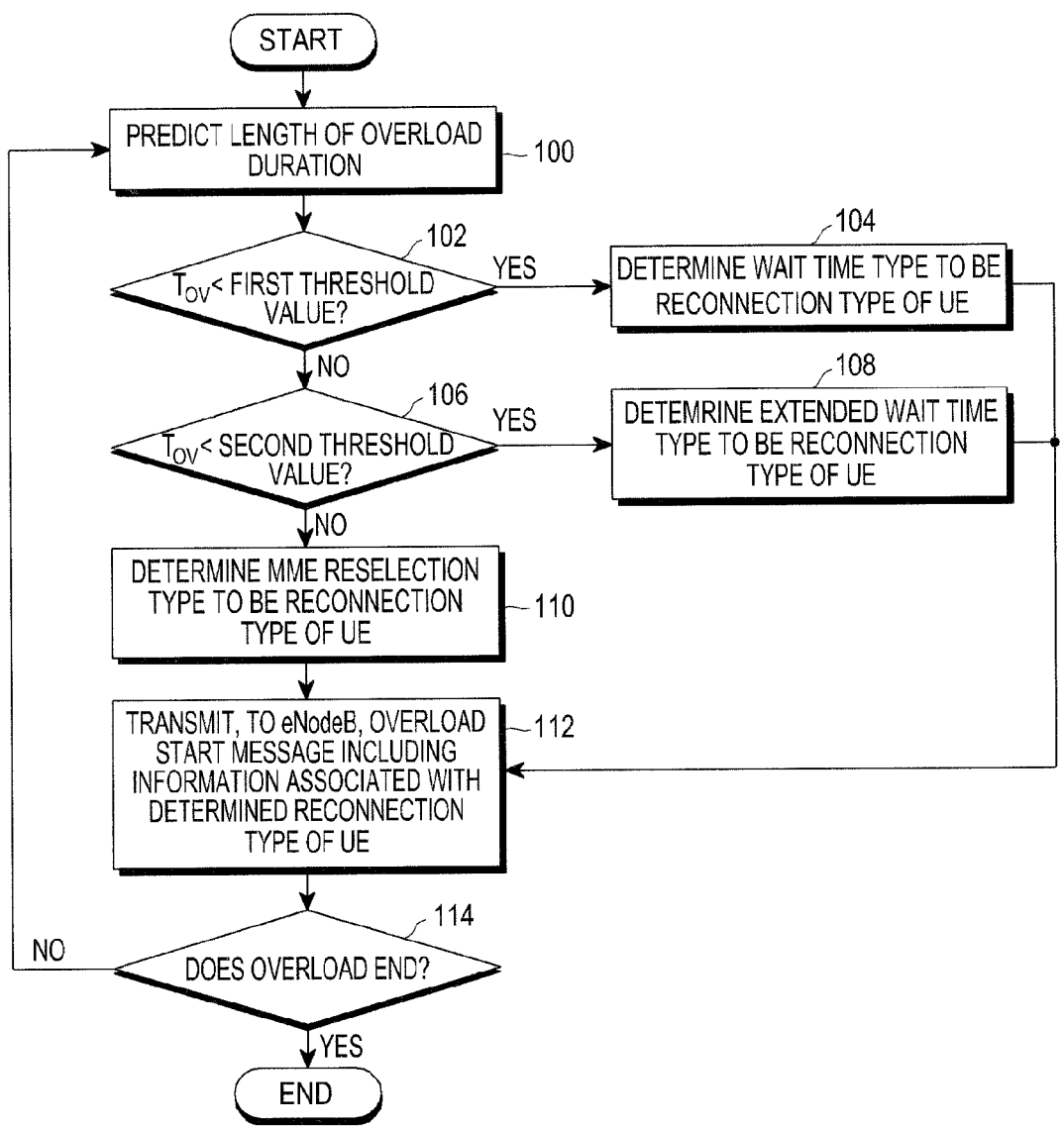
FIG. 1 illustrates a process in which a Mobility Management Entity (MME) predicts a length of an overload duration so as to determine a reconnection type of a User Equipment (UE) in a mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the descriptions of the various embodiments of the present disclosure, a Long Term Evolution (LTE) system of 3rd Generation Partnership Project (3GPP) or a Long Term Evolution-Advanced (LTE-A) communication system that supports the coupling of carrier waves are mainly described. However, the subject matter of the present disclosure will be applicable to other communication systems having a similar technical background and channel form through slight modifications made within the scope that is not apart from the present disclosure, and the modifications can be made by those skilled in the field of the present disclosure.

The present specifications provide a method and an apparatus for controlling a connection of a User Equipment (UE) in a mobile communication system. More particularly, the present disclosure provides a method and an apparatus for reducing the connection time of a UE with respect to Mobility Management Entity (MME) and balancing load on MMEs (load balancing), by determining a reconnection type of the UE based on a length of an overload duration of the MME in a mobile communication system.

In an embodiment of the present disclosure, a plurality of UEs are connected to a network through an evolved Node B (eNodeB), and a single UE is connected to one of a plurality of MMEs included in an MME pool and is managed. Each MME manages a plurality of UEs and, thus, an overload may occur when an excessively large amount of information is generated. In this case, a corresponding MME may transmit a command to restrict the connection of a UE to an eNodeB using an overload start message. In an embodiment of the present disclosure, the command that restricts the connection of a UE included in the overload start message is different based on a length of an overload duration, and may include information associated with a reconnection type of the UE.

Hereinafter, referring to FIG. 1, there is provided a process in which an MME according to an embodiment of the present disclosure predicts a length of an overload duration, and determines a reconnection type of a UE.

FIG. 1 illustrates a process in which an MME predicts a length of an overload duration so as to determine a reconnection type of a UE in a mobile communication system according to an embodiment of the present disclosure.

Referring to FIG. 1, when an overload occurs, an MME predicts a length of an overload duration ($T_{OV}$) in operation 100. The overload duration may be determined based on the number of Radio Resource Control (RRC)-connected UEs. The MME determines whether the overload duration is less than a first threshold value in operation 102. When the overload duration is less than the first threshold value, the MME proceeds with operation 104, and determines a waiting time type (hereinafter, referred to as a 'wait time type') to be the reconnection type of the UE. The wait time type indicates a type in which the UE attempts reconnection to the MME after $T_W$ which is a waiting time.

When the overload duration is greater than or equal to the first threshold value, the MME proceeds with operation 106 and determines whether the overload duration is less than a second threshold value.

When the overload duration is greater than or equal to the first threshold value and less than the second threshold value, the MME proceeds with operation 108, and determines an extended waiting time type (hereinafter, referred to as an 'extended wait time type') to be the reconnection type of the UE. The extended wait time type indicates a type in which the UE attempts reconnection to the MME after $T_{EW}$ that is an extended waiting time. Here, $T_{EW}$ is longer than $T_W$ and, thus, reconnection of the UE to the MME is blocked for a longer amount of time as compared to the wait time type.

When the overload duration is greater than or equal to the second threshold value, the MME proceeds with operation 110 and determines an MME reselection type to be the reconnection type of the UE. The MME reselection type indicates a type in which the UE selects another MME which is not overloaded from an MME pool.

When the reconnection type of the UE is determined, in operations 104, 108, and 110, the MME proceeds with operation 112, and includes information associated with the determined reconnection type of the UE in an overload start message and transmits the same to an eNodeB. Thereafter, the eNodeB receives the overload start message, and, when receiving a connection request from the UE, rejects the connection request and transmits, to the UE, information associated with the reconnection type of the UE included in the overload start message. The UE requests connection to the MME after $T_W$ or $T_{EW}$, or may request connection to another MME, based on the information associated with the reconnection type of the UE.

The MME determines whether the overload is removed in operation 114, and terminates all the processes when the overload is removed. When the overload state continues, the MME returns to operation 100 and repeats the process in FIG. 1.

In FIG. 1, the first threshold value and the second threshold value are determined based on a maximum permissible number of reconnections of the UE, $T_W$, and $T_{EW}$. The maximum permissible number of reconnections indicates the maximum number of times that the UE is allowed to retransmit an RRC connection request message. As shown in Equation 1, the first threshold value is determined by the product of the maximum permissible number of reconnections and $T_W$, and the second threshold value is determined by the product of the maximum permissible number of reconnections and $T_{EW}$.

$T_W$=wait time $T_{EW}$=extended wait time $\delta_S = N300 \times T_W$ $\delta_M = N300 \times T_{EW}$ $$T_W \leq T_{EW} \leq N300 \times T_W \qquad \text{Equation 1}$$

In Equation 1, $\delta_S$ denotes the first threshold value, $\delta_M$ denotes the second threshold value, and N300 denotes the maximum permissible number of reconnections. For reference, the second threshold value may be determined to be greater than or equal to $T_{EW}$.

As described in FIG. 1, in an embodiment of the present disclosure, the reconnection type of the UE may be classified into a wait time type, an extended wait time type, and an MME reselection type, based on a length of an overload duration of an MME. Hereinafter, the wait time type, the extended wait time type, and the MME reselection type will be described with reference to FIGS. 2 through 4.

First, the wait time type will be described with reference to FIG. 2.

Figure 2:
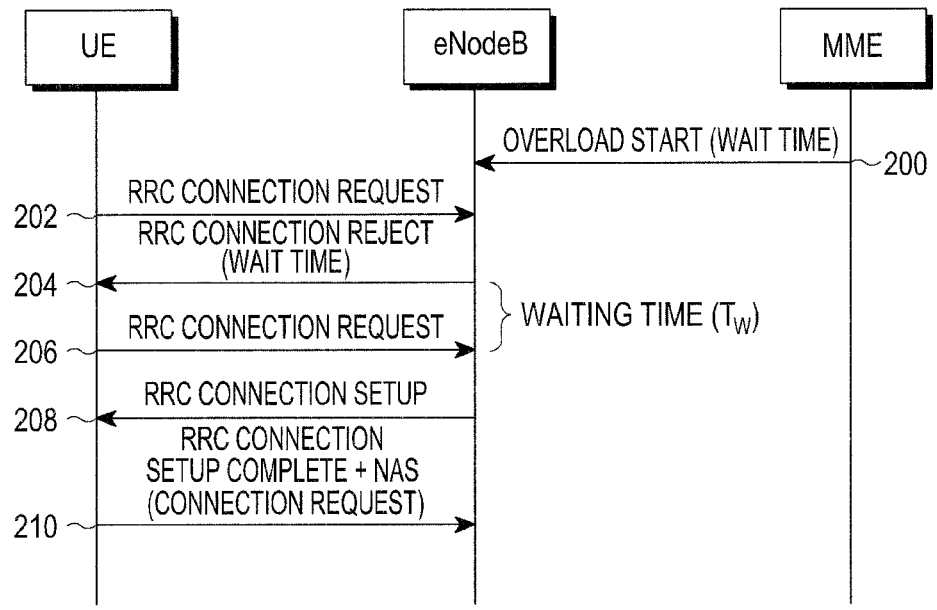
FIG. 2 is a signaling flowchart illustrating use of a wait time type in a mobile communication system according to an embodiment of the present disclosure.

FIG. 2 is a signaling flowchart illustrating use of a wait time type in a mobile communication system according to an embodiment of the present disclosure.

Referring to FIG. 2, when an overload occurs, an MME that currently manages context information and the like of a UE determines a reconnection type of the UE by executing the process in FIG. 1. When the wait time type is determined to be the reconnection type of the UE, the MME includes, in an overload start message, information indicating that the wait time type is determined to be the reconnection type, and transmits the same to an eNodeB in operation 200.

When an RRC connection request message is received from the UE in operation 202, the eNodeB includes, in an RRC connection reject message, information indicating that the wait time type is determined to be the reconnection type, and transmits the same to the UE in operation 204. The RRC connection request message includes message type information and identification information of the UE, for example, an SAE-Temporary Mobile Subscriber Identity (S-TMSI). The S-TMSI is an identifier that the MME assigns to the UE, and the eNodeB determines in which MME the UE is registered based on the S-TMSI, and rejects the connection request of the UE.

The UE determines that a reconnection process needs to be executed based on the wait time type, and transmits an RRC connection request message to the eNodeB after $T_W$ that is a waiting time, in operation 206. When it is determined that the overload of the MME ends after $T_W$, the eNodeB transmits an RRC connection setup message to the UE in operation 208 so that the UE reconnects to the MME.

When it is determined that the overload of the MME does not end after $T_W$, the eNodeB transmits an RRC connection reject message to the UE so as to continuously block the connection of the UE. The eNodeB may determine whether the overload of the MME ends after $T_W$, based on whether an overload stop message indicating that the overload ends is received from the MME before $T_W$ passes.

When the UE receives the RRC connection setup message from the eNodeB, the UE transmits an RRC connection setup complete message and an MME connection request (attach request) message to the eNodeB in operation 210. Thereafter, the eNodeB transfers the MME connection request message to the MME, so that a bearer and a session associated with the UE may be generated and may be managed by the MME.

Thereafter, the extended wait time type will be described with reference to FIG. 3.

Figure 3:
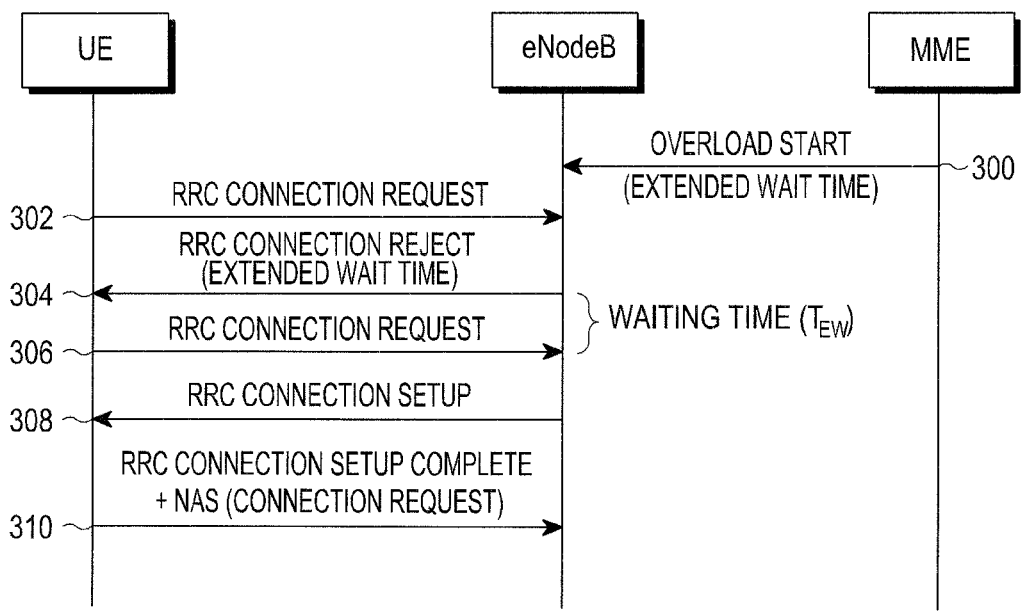
FIG. 3 is a signaling flowchart illustrating use of an extended wait time type in a mobile communication system according to an embodiment of the present disclosure.

FIG. 3 is a signaling flowchart illustrating use of an extended wait time type in a mobile communication system according to an embodiment of the present disclosure.

Referring to FIG. 3, when an overload occurs, an MME that currently manages context information and the like of a UE determines a reconnection type of the UE by executing the process in FIG. 1. When the extended wait time type is determined to be the reconnection type of the UE, the MME includes, in an overload start message, information indicating that the extended wait time type is determined to be the reconnection type, and transmits the same to an eNodeB in operation 300.

When an RRC connection request message is received from the UE in operation 302, the eNodeB includes, in an RRC connection reject message, information indicating that the extended wait time type is determined to be the reconnection type, and transmits the same to the UE in operation 304. The RRC connection request message includes message type information, and identification information of the UE, for example, an S-TMSI. Therefore, the eNodeB may reject the connection request of the UE based on the S-TMSI.

Thereafter, the UE determines that a reconnection process needs to be executed based on the extended wait time type, and transmits an RRC connection request message to the eNodeB after $T_{EW}$ that is a waiting time, in operation 306. When it is determined that an overload of the MME ends after $T_W$, the eNodeB transmits an RRC connection setup message to the UE in operation 308 so that the UE reconnects to the MME.

When it is determined that the overload of the MME does not end after $T_{EW}$, the eNodeB transmits an RRC connection reject message to the UE so as to continuously block the connection of the UE. The eNodeB may determine whether the overload of the MME ends after $T_{EW}$, based on whether an overload stop message is received from the MME before $T_{EW}$ passes.

When the UE receives the RRC connection setup message from the eNodeB, the UE transmits an RRC connection setup complete message and an MME connection request message to the eNodeB in operation 310. Thereafter, the eNodeB transfers the MME connection request message to the MME, so that a bearer and a session associated with the UE may be generated and may be managed by the MME.

Thereafter, the MME reselection type will be described with reference to FIGS. 4A and 4B, and FIGS. 5A and 5B.

According to an embodiment of the present disclosure, the MME reselection type may be classified into two types based on whether timer information is used when an Old MME that currently manages context information and the like of a UE deletes the context information of the UE. First, an MME reselection type that uses timer information will be described with reference to FIGS. 4A and 4B.

Figure 4A:
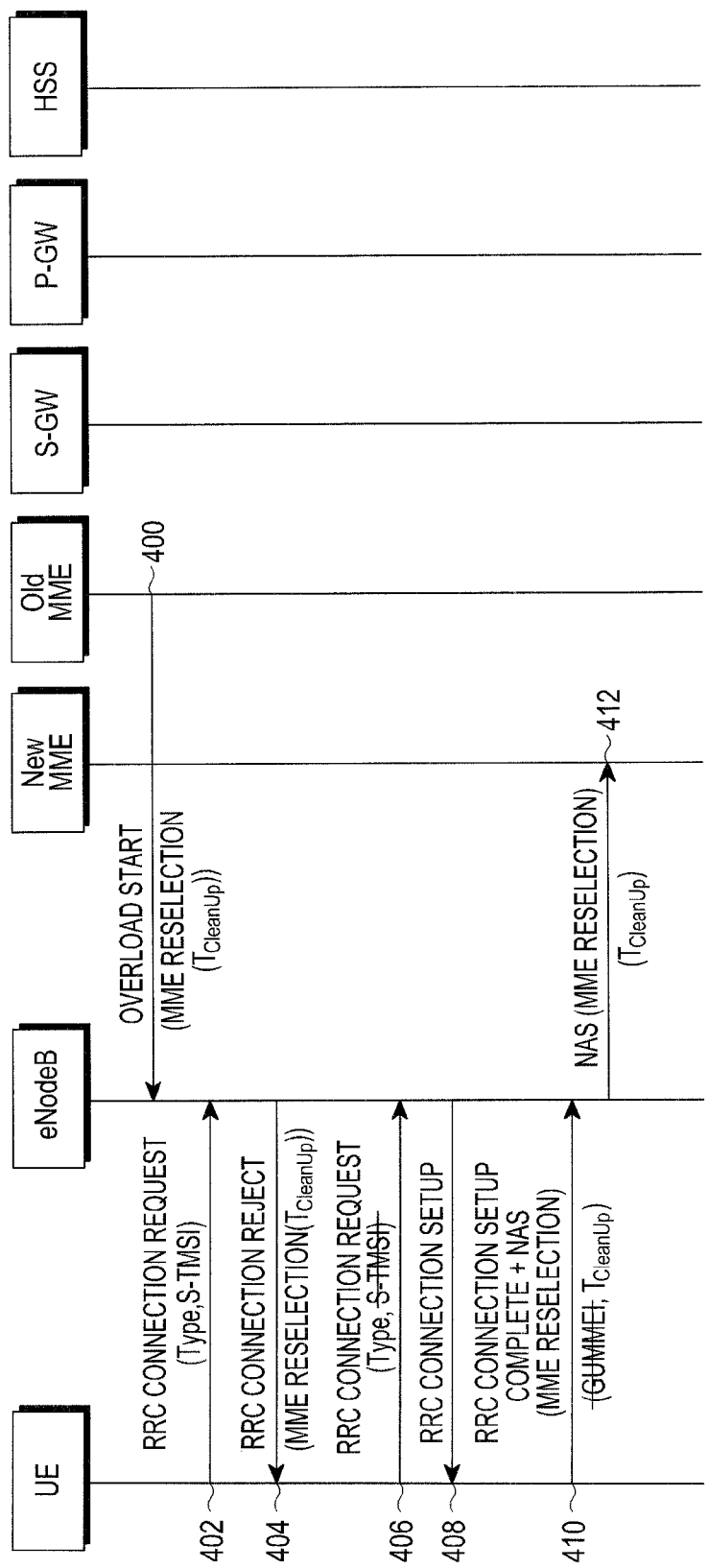
FIGS. 4A and 4B are signaling flowcharts illustrating use of an MME reselection type that uses timer information in a mobile communication system according to an embodiment of the present disclosure.
Figure 4B:
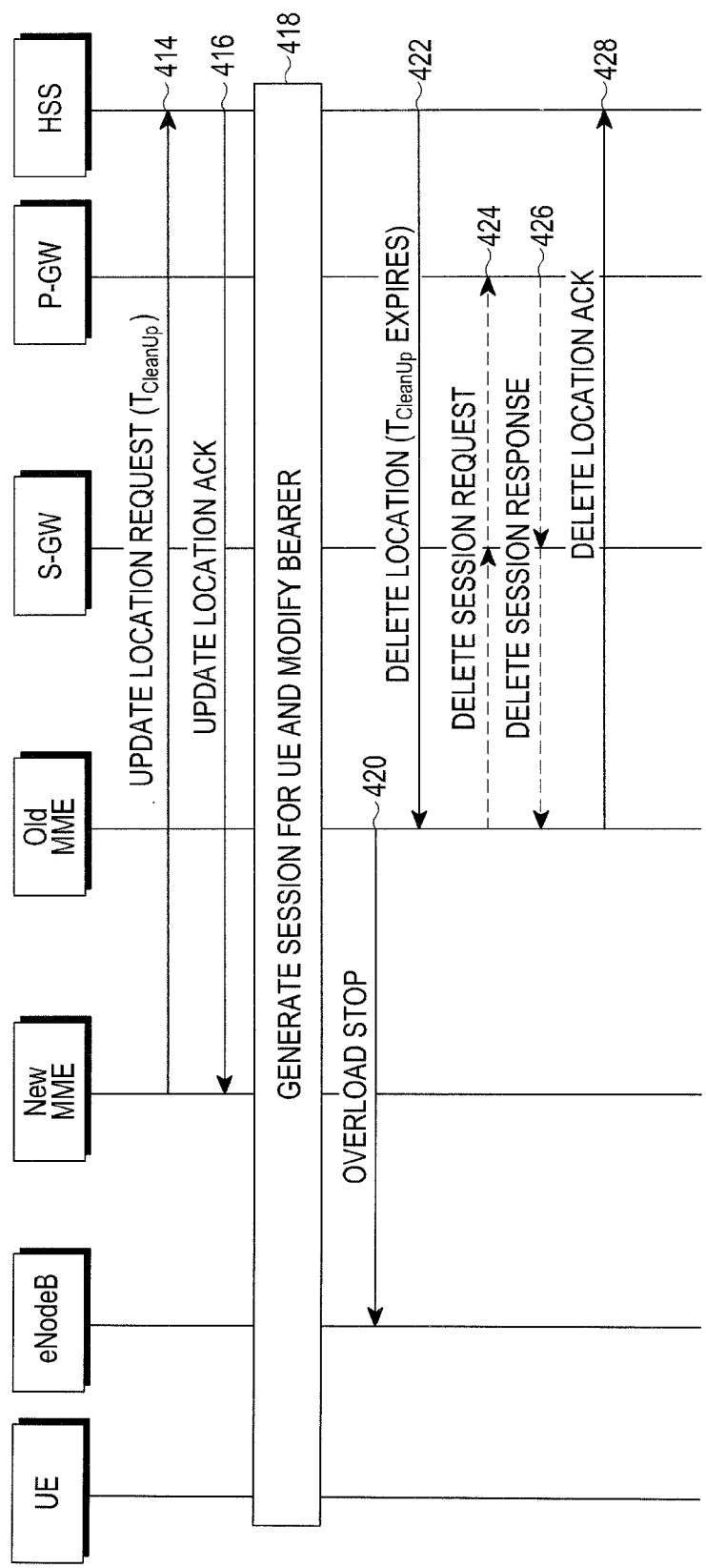

FIGS. 4A and 4B are signaling flowcharts illustrating use of an MME reselection type that uses timer information in a mobile communication system according to an embodiment of the present disclosure.

Referring to FIG. 4A, when an overload occurs, an Old MME determines a reconnection type of a UE by executing the process in FIG. 1. When the MME reselection type is determined to be the reconnection type of the UE, the Old MME includes, in an overload start message, information indicating that the MME reselection type is determined to be the reconnection type and timer information ($T_{CleanUp}$) used for determining a point in time when the Old MME deletes the context information of the UE, and transmits the same to an eNodeB in operation 400.

When an RRC connection request message is received from the UE in operation 402, the eNodeB includes, in an RRC connection reject message, information indicating that the MME reselection type is determined to be the reconnection type and the timer information ($T_{CleanUp}$), and transmits the same to the UE in operation 404. The RRC connection request message includes message type information, and identification information of the UE, for example, an S-TMSI. Therefore, the eNodeB may determine that the UE is a UE registered in the Old MME where the overload occurs, based on the S-TMSI, and may reject the RRC connection request of the UE.

Thereafter, the UE determines that a reconnection process needs to be executed based on the MME reselection type, and transmits an RRC connection request message excluding the S-TMSI to the eNodeB in operation 406. When the RRC connection request message excludes the S-TMSI, the eNodeB determines that the UE is not registered in any MME. Therefore, the eNodeB transmits an RRC connection setup message to the UE in operation 408.

In operation 410, the UE transmits an RRC connection setup complete message and an MME reselection message including the timer information ($T_{CleanUp}$) to the eNodeB. Here, the UE does not include a Globally Unique MME Identifier (GUMMEI) in the RRC connection setup complete message, for MME reselection. For example, the UE may not transmit information associated with the Old MME to the eNodeB.

The eNodeB transfers the MME reselection message received from the UE to a New MME, together with the timer information ($T_{CleanUp}$) in operation 412. The MME reselection message includes information indicating that the MME information of the UE is included in a Home Subscriber Server (HSS). The New MME may be an MME randomly selected from among a plurality of MMEs excluding the MME where the overload occurs in an MME pool, or may be an MME selected based on a set scheme (for example, a NAS Node Selection Function (NNSF) of the eNodeB).

The operations of the New MME will be described with reference to FIG. 4B.

Referring to FIG. 4B, the New MME transmits an update location request message to an HSS in operation 414 so as to register the UE. The update location request message includes information indicating that the UE has executed MME reselection, and the timer information ($T_{CleanUp}$).

When an overload state ends, the HSS stores information associated with the Old MME of the UE and information associated with the New MME, so as to delete context information of the UE registered in the Old MME. When the update location request message is received, the HSS transmits, to the New MME, an update location Acknowledgement (ACK) message in response to the update request message, in operation 416.

The New MME generates a session for the UE and modifies a bearer, in operation 418. More particularly, the New MME transmits a create session request message to the UE to a Packet Data Network Gateway (P-GW). When a create session response message is received from the P-GW in response to the create session request message, the New MME transmits an initial context setup request message to the eNodeB. Subsequently, as an RRC connection is reestablished between the eNodeB and the UE, the New MME receives an initial context setup response message in response to the initial context setup request message. The New MME transmits a modify bearer request message to a serving data network gateway (S-GW), and receives a modify bearer response message from the S-GW in response to the modify bearer request message.

When the overload state ends, the Old MME transmits a message indicating that the overload state ends to the eNodeB in operation 420. The Old MME determines whether a delete location request message is received from the HSS. When a timer associated with the timer information ($T_{CleanUp}$) expires, the HSS transmits the delete location request message to the Old MME in operation 422.

When the delete location request message is received, the Old MME transmits a delete session request message to the P-GW in operation 424, so as to delete the context information of the UE. When a delete session response message is received in response to the delete session request message in operation 426, the Old MME transmits a delete location ACK message to the HSS in operation 428.

Hereinafter, the MME reselection type that does not use the timer information will be described with reference to FIGS. 5A and 5B.

Figure 5A:
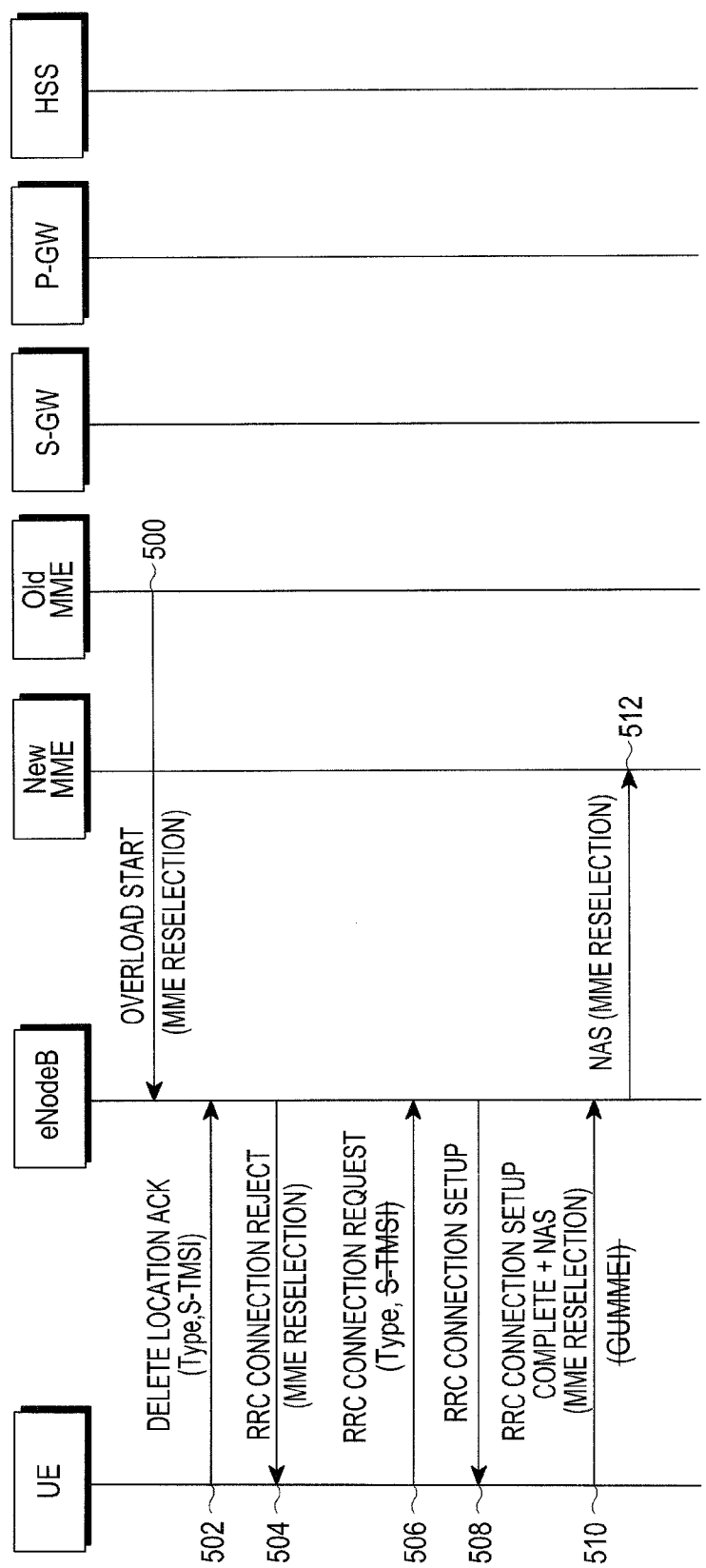
FIGS. 5A and 5B are signaling flowcharts illustrating use of an MME reselection type that does not use timer information in a mobile communication system according to an embodiment of the present disclosure.
Figure 5B:
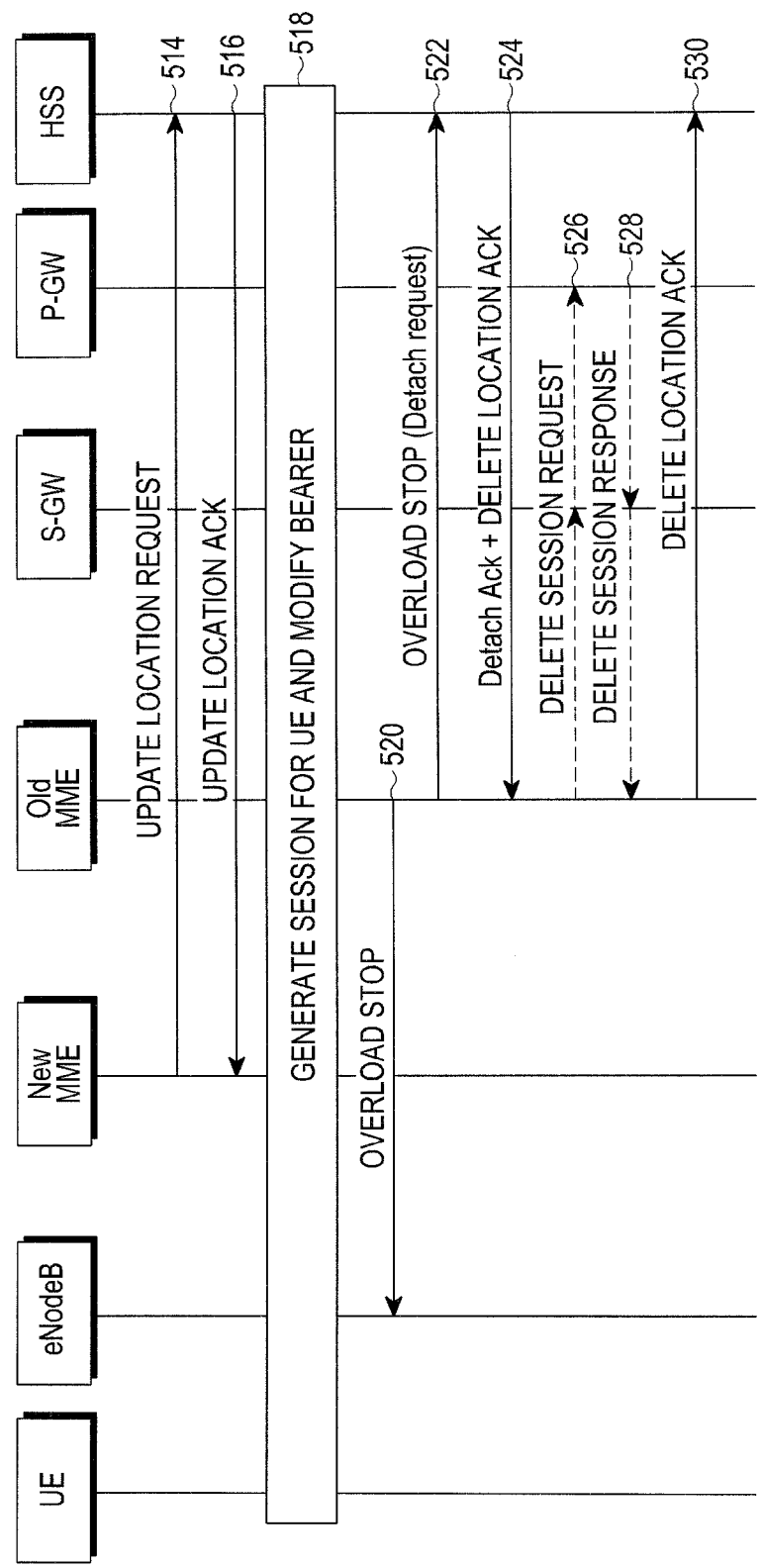

FIGS. 5A and 5B are signaling flowcharts illustrating use of an MME reselection type that does not use timer information in a mobile communication system according to an embodiment of the present disclosure.

Referring to FIGS. 5A and 5B, excluding that timer information ($T_{CleanUp}$) is not included in an overload start message of operation 500, an RRC connection reject message of operation 504, an MME reselection message of operations 510 and 512, and an update location request message of operation 514, operations 500 through 520 are identical to operations 400 through 420 of FIGS. 4A and 4B and thus, descriptions thereof will be omitted.

When an overload state ends, an Old MME transmits an overload stop message to an HSS in operation 522. When a delete location request message is received from the HSS in operation 524, the Old MME transmits a delete session request message to a P-GW in operation 526, so as to delete the context information of the UE. When a delete session response message is received in response to the delete session request message in operation 528, the Old MME transmits a delete location ACK message to the HSS in operation 530.

Hereinafter, a message format transceived when the MME reselection type of FIGS. 4A and 4B and FIGS. 5A and 5B is used will be described.

First, an overload action Information Element (IE) as shown in Table 1 is included in an overload start message transmitted from the Old MME to an eNodeB in operation 400 of FIG. 4A and operation 500 of FIG. 5A.

TABLE 1

| IE/Group Name | Presence | Range | IE type and reference |
|---|---|---|---|
| Overload Action | M | | ENUMERATED (Reject RRC connection establishments for non-emergency MO DT, Reject RRC connection establishments for Signalling, Permit Emergency Sessions and mobile terminated services only, . . . , Permit High Priority Sessions and mobile terminated services only, Reject delay tolerant access, Reject RRC connection establishment with extended wait time, MME re-selection) |

The overload action IE of Table 1 includes information that is conventionally included in the overload action IE (for example, IE written in Overload Action of 3GPP TS 36.413 V10.2.0 (2011-06)), and information associated with a reconnection type of a UE according to an embodiment of the present disclosure. More particularly, the overload action IE may include the IEs that may be conventionally included in the overload action IE, and one of a "Reject RRC connection establishment with extended wait time" IE indicating that the reconnection type of the UE is determined to be an extended wait time type, and an "MME re-selection" IE indicating that the reconnection type of the UE is determined to be an MME reselection type.

When a UE that was connected to the Old MME connects to a corresponding eNodeB, the "Reject RRC connection establishment with extended wait time" IE is used to enable the UE to reconnect to the Old MME after $T_{EW}$. When the MME overload duration is greater than the first threshold value and less than the second threshold value, the "Reject RRC connection establishment with extended wait time" IE may be included in the overload action IE.

When a UE that was connected to the Old MME connects to a corresponding eNodeB, the "MME re-selection" IE is used to enable the UE to execute MME reselection. When the MME overload duration is greater than or equal to the second threshold value, the "MME re-selection" IE may be included in the overload action IE.

The overload action IE is included in an overload start message and is transmitted from an MME to an eNodeB, and, when the MME reselection type is used, may include timer information like the overload start message transmitted in operation 400 of FIG. 4A. The format of an overload start message including the timer information is as shown in Table 2.

TABLE 2

| IE/Group Name | Presence | Range | IE type and reference |
|---|---|---|---|
| Message Type | M | | 9.2.1.1 |
| Overload Response | M | | 9.2.3.19 |
| GUMMEI List | | 0 . . . 1 | |
| Traffic Load Reduction Indication | O | | 9.2.3.36 |
| Tcleanup | | | |

As shown in Table 2, when the MME reselection type that uses a timer is used, the overload start message includes IEs that are conventionally included in the overload start message (that is, a message type IE, an overload response IE, a GUMMEI list IE, a traffic load reduction indication IE (for example, please refer to Overload Start of 3GPP TS 36.413 V10.2.0 (2011-06)), and may additionally include a "$T_{cleanup}$" IE which is timer information.

The format of the overload start message transmitted when the MME reselection type that does not use timer information is used may be configured in a form that excludes the "$T_{cleanup}$" IE among the IEs shown in Table 2, like the overload start message transmitted in operation 500 of FIG. 5A.

The RRC connection reject message transmitted from an eNodeB to a UE in operation 404 of FIG. 4A and operation 504 of FIG. 5A includes a rejection cause IE as shown in Table 3.

TABLE 3

| Information Element/Group name | Need | Multi | Type and reference | Semantics description |
|---|---|---|---|---|
| Rejection cause | MP | | Enumerated(congestion, unspecified, Reject RRC connection establishment with extended wait time, MME re-selection) | |

Similar to the overload action IE included in the overload start message, the rejection cause IE in Table 3 includes information that may be conventionally included in the rejection cause IE (that is, congestion IE and unspecified IE) (for example, please refer to Rejection cause of 3GPP TS 25.331 V10.4.0 (2011-06)), and information associated with a reconnection type of a UE according to an embodiment of the present disclosure.

More particularly, the rejection cause IE may include the IEs that may be conventionally included in the overload action IE, and one of a "Reject RRC connection establishment with extended wait time" IE indicating that the reconnection type of the UE is determined to be an extended wait time type, and an "MME re-selection" IE indicating that the reconnection type of the UE is determined to be an MME reselection type. An IE that may be included in the rejection cause IE in association with the reconnection type of the UE may be determined based on the overload action IE included in the overload start message.

When the MME reselection type that uses the timer information is used, the RRC connection reject message transmitted in operation 404 of FIG. 4A may include timer information. The format of the RRC connection reject message including the timer information is as shown in Table 4.

TABLE 4

| Information Element/Group name | Need | Multi | Type and reference |
|---|---|---|---|
| Message Type | MP | | Message Type |
| UE information elements | | | |
| RRC transaction identifier | MP | | RRC transaction identifier 10.3.3.36 |
| Initial UE identity | MP | | Initial UE identity 10.3.3.15 |
| Rejection cause | MP | | Rejection cause 10.3.3.31 |
| Wait time | MP | | Wait time 10.3.3.50 |
| Redirection info | OP | | Redirection info 10.3.3.29 |
| Counting completion | OP | | Enumerated (TRUE) |
| Extended Wait Time | OP | | Extended Wait Time 10.3.3.12a |
| Tclenaup | | | |

As shown in Table 4, when the MME reselection type that uses the timer is used, the RRC connection reject message may include a "Message Type" IE, a "UE information elements" IE, an "RRC transaction identifier" IE, an "Initial UE Identity" IE, a "Rejection cause" IE, a "Wait time" IE, a "Redirection info" IE, a "Counting completion" IE, and an "extended wait time" IE (for example, please refer to RRC Connection Reject of 3GPP TS 25.331 V10.4.0 (2011-06)), and may additionally include a "$T_{cleanup}$" IE which is timer information. When the MME reselection type that does not use the timer information is used, the RRC connection rejection message excludes the "$T_{cleanup}$" IE.

The format of the MME reselection message transmitted from a UE to an eNodeB in operation 410 of FIG. 4A and operation 510 of FIG. 5A is as shown in Table 5.

TABLE 5

| IEI | Information Element |
|---|---|
| | Protocol discriminator |
| | Security header type |
| | Attach request message identity |
| | . . . |
| 5D | Voice domain preference and UE's usage setting |
| D- | Device properties |
| E- | Old GUTI type |
| | MME re-selection |

As shown in Table 5, the MME reselection message transmitted based on an NAS protocol is configured to include IEs that are conventionally included in a connection message (Attach Message)(that is, a "Protocol discriminator" IE, a "Security header type" IE, a "Attach request message identity" IE, . . . , a "voice domain preference and UE's usage setting" IE, a "Device properties" IE, and an "Old GUTI type" IE)(for example, please refer to Attach request of 3GPP TS 24.301 V10.3.0 (2011-06)), and may additionally include an "MME re-selection" IE.

The MME reselection IE is used based on a flag. For example, when the flag is set to 0, the MME reselection message indicates that the MME information of the UE is included in an HSS, and when the flag is undefined, the MME reselection message may be used as a general connection message (Attach Message).

Unlike the MME reselection message transmitted in operation 510 of FIG. 5A, the MME reselection message transmitted in operation 410 of FIG. 4A may additionally include a "$T_{cleanup}$" IE as the timer information as shown in Table 6.

TABLE 6

| IEI | Information Element |
|---|---|
| | Protocol discriminator |
| | Security header type |
| | Attach request message identity |
| | . . . |
| 5D | Voice domain preference and UE's usage setting |
| D- | Device properties |
| E- | Old GUTI type |
| | MME re-selection |
| | Tcleanup |

The format of the update location request message transmitted from a New MME to an HSS is as shown in Table 7.

TABLE 7

| Information element name | Mapping to Diameter AVP | Cat. |
|---|---|---|
| IMSI | User-Name (See IETF RFC 3588 [4]) | M |
| Supported Features (See 3GPP TS 29.229 [9]) | Supported-Features | O |
| Terminal Information (See 7.3.3) | Terminal-Information | O |
| ULR Flags (See 7.3.7) | ULR-Flags | M |
| Visited PLMN Id (See 7.3.9) | Visited-PLMN-Id | M |
| RAT Type (See 7.3.13) | RAT-Type | M |
| SGSN number (See 7.3.102) | SGSN-Number | C |
| Homogeneous Support of IMS Voice Over PS Sessions | Homogeneous-Support-of-IMS-Voice-Over-PS-Sessions | O |
| V-GMLC address | GMLC-Address | C |
| Active APN | Active-APN | O |
| UE SRVCC Capability | UE-SRVCC-Capability | C |
| Tcleanup | | |

As shown in Table 7, the update location request message may include IEs that are conventionally included in the update location request message, that is, an "International Mobile Subscriber Identify (IMSI)" IE, a "Supported Features" IE, a "Terminal Information" IE, a "ULR flag" IE, a "Visited Public Land Mobile Network (PLMN)" IE, an "RAT type" IE, a "Serving GPRS Support Node number (SGSN number)" IE, a "Homogeneous Support of IMS Voice Over PS Sessions" IE, a Visited Gateway Mobile Location Center (V-GMLC) address, an "Active Access Point Name (APN) IE", and a "UE Single Radio Voice Call Continuity (SRVCC) Capability IE)(for example, please refer to Update Location Request of 3GPP TS 29.272), and additionally includes a "$T_{cleanup}$" IE that is timer information.

Thereafter, the format of the overload stop message transmitted from an Old MME to an HSS in operation 522 of FIG. 5B is as shown in Table 8.

TABLE 8

| IE/Group Name | Presence | Range | IE type and reference |
|---|---|---|---|
| Message Type | | | |
| >Procedure Code | M | | (Handover Preparation, Handover Resource Allocation, Handover Notification, Path Switch Request, Handover Cancellation, E-RAB Setup, E-RAB Modify, E-RAB Release, . . . Uplink UE Associated LPPa transport, Downlink Non UE Associated LPPa transport, Uplink Non UE Associated LPPa transport, Delete Old MME Information . . .) |
| >Type of Message | M | | CHOICE (Initiating Message, Successful Outcome, Unsuccessful Outcome, . . .) |

As shown in Table 8, the overload stop message according to an embodiment of the present disclosure includes a "Delete Old MME Information" IE in addition to a procedure code of the message type IE (for example, please refer to overload stop of 3GPP TS 36.413 V10.2.0 (2011-06)). When an overload state of the Old MME ends, the "Delete Old MME Information" IE indicates information instructing the HSS to delete information associated with the Old MME.

As described above, an embodiment of the present disclosure additionally includes information proposed in the embodiment of the present disclosure in a message used in the mobile communication system of the related art and thus, a method and an apparatus proposed in the embodiment of the present disclosure may be efficiently applied to the mobile communication system of the related art.

Hereinafter, the operations of an MME for controlling connection of a UE according to an embodiment of the present disclosure will be described with reference to FIG. 6.

Figure 6:
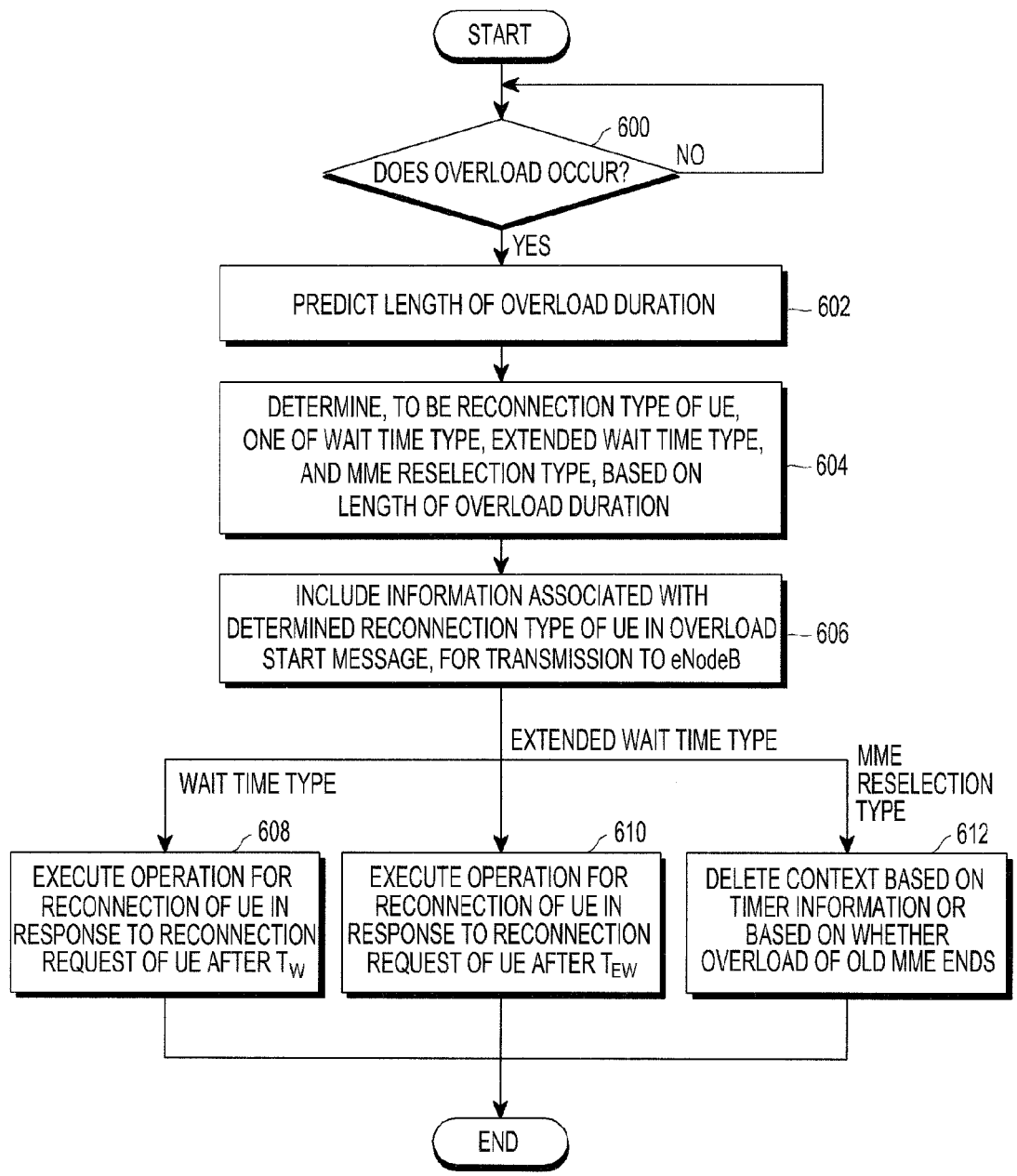
FIG. 6 is a flowchart illustrating a process of operations of an MME for controlling a connection of a UE according to an embodiment of the present disclosure.

FIG. 6 is a flowchart illustrating a process of operations of an MME for controlling a connection of a UE according to an embodiment of the present disclosure.

Referring to FIG. 6, the MME determines whether an overload occurs in operation 600. When it is determined that the overload occurs, the MME proceeds with operation 602 to predict a length of an overload duration. The MME proceeds with operation 604 so as to determine one of a wait time type, an extended wait time type, and an MME reselection type to be a reconnection type of a UE, based on the length of the overload duration.

The MME includes information associated with the determined reconnection type of the UE in an overload start message, and transmits the same to an eNodeB in operation 606. Here, when the determined reconnection type of the UE is the MME reselection type, timer information may be included.

When the determined reconnection type of the UE is the wait time type, the MME executes an operation for the reconnection of the UE in response to a connection request of the UE transmitted after $T_W$ in operation 608. When the determined reconnection type of the UE is the extended wait time type, the MME executes an operation for the reconnection of the UE in response to a connection request of the UE sent after $T_{EW}$ in operation 610.

When the MME reselection type is the reconnection type of the UE, the MME deletes context information of the UE based on timer information or based on whether the overload of the MME ends in operation 612. More particularly, when the reconnection type of the UE is the MME reselection type that uses the timer information, the MME determines whether the overload ends. When the overload ends, the MME transmits a message indicating that the overload ends to the eNodeB. Thereafter, when a request for deleting the context information of the UE is received from the HSS as a timer expires, the MME deletes the context information of the UE.

When the reconnection type of the UE is the MME reselection type that does not use the timer information, the MME determines whether the overload ends. When the overload ends, the MME transmits a message indicating that the overload ends to the eNodeB and the HSS. Thereafter, when a request for deleting the context information of the UE is received from the HSS, the MME deletes the context information of the UE.

Hereinafter, operations of an eNodeB according to an embodiment of the present disclosure will be described with reference to FIG. 7.

Figure 7:
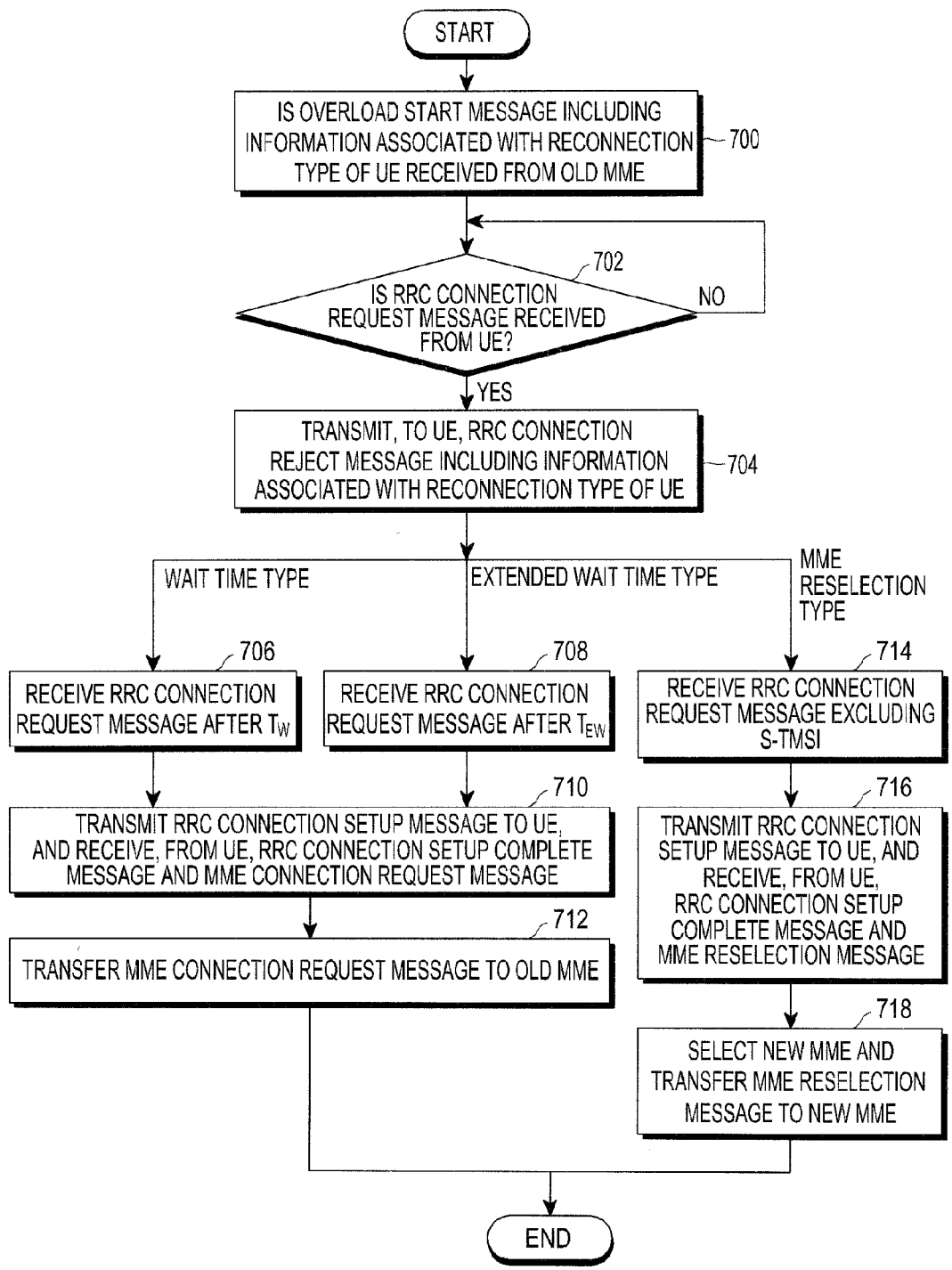
FIG. 7 is a flowchart illustrating a process of operations of an evolved Node B (eNodeB) according to an embodiment of the present disclosure.

FIG. 7 is a flowchart illustrating a process of operations of an eNodeB according to an embodiment of the present disclosure.

Referring to FIG. 7, an eNodeB receives an overload start message including information associated with a reconnection type of a UE from an Old MME that managed a context of the UE in operation 700. The eNodeB determines whether an RRC connection request message is received from the UE in operation 702.

When the RRC connection request message is received, the eNodeB transmits, to the UE, an RRC connection reject message including information associated with the reconnection type of the UE in operation 704. Here, when the reconnection type of the UE is an MME reselection type, the eNodeB may include timer information in the RRC connection reject message.

When the reconnection type of the UE is a wait time type, the eNodeB receives an RRC connection request message from the UE after $T_W$ which is a waiting time in operation 706. In the case where it is determined that an overload of the Old MME is not removed after $T_W$, the eNodeB transmits an RRC connection reject message to the UE so as to continuously block the connection of the UE.

When the reconnection type of the UE is an extended wait time type, the eNodeB receives an RRC connection request message from the UE after $T_{EW}$ which is a waiting time in operation 708. In the case where it is determined that the overload of the Old MME is not removed after $T_{EW}$, the eNodeB transmits an RRC connection reject message to the UE so as to continuously block the connection of the UE. When it is determined that the overload of the Old MME is removed after $T_W$ (in the case of the wait time type) or $T_{EW}$ (in the case of the extended wait time type), the eNodeB transmits an RRC connection setup message to the UE, and receives an RRC connection setup complete message and an MME connection request message in operation 710. The eNodeB transfers the MME connection request message to the Old MME in operation 712 so that the UE connects to the Old MME.

When the reconnection type of the UE is the MME reselection type, the eNodeB receives an RRC connection request message excluding an S-TMSI in operation 714. The eNodeB transmits an RRC connection setup message to the UE, and receives an RRC connection setup complete message and an MME reselection message in operation 716. GUMMEI may not be included in the RRC connection setup complete message, and timer information may be included in the MME reselection message. Subsequently, the eNodeB transfers the MME reselection message to a New MME so that the UE selects another MME which is not overloaded as the New MME and the UE connects to the New MME in operation 718. When an overload stop message indicating that the overload state ends is received from the Old MME, the eNodeB cancels blocking the connection of the UE to the Old MME.

Hereinafter, operations of a UE according to an embodiment of the present disclosure will be described with reference to FIG. 8.

Figure 8:
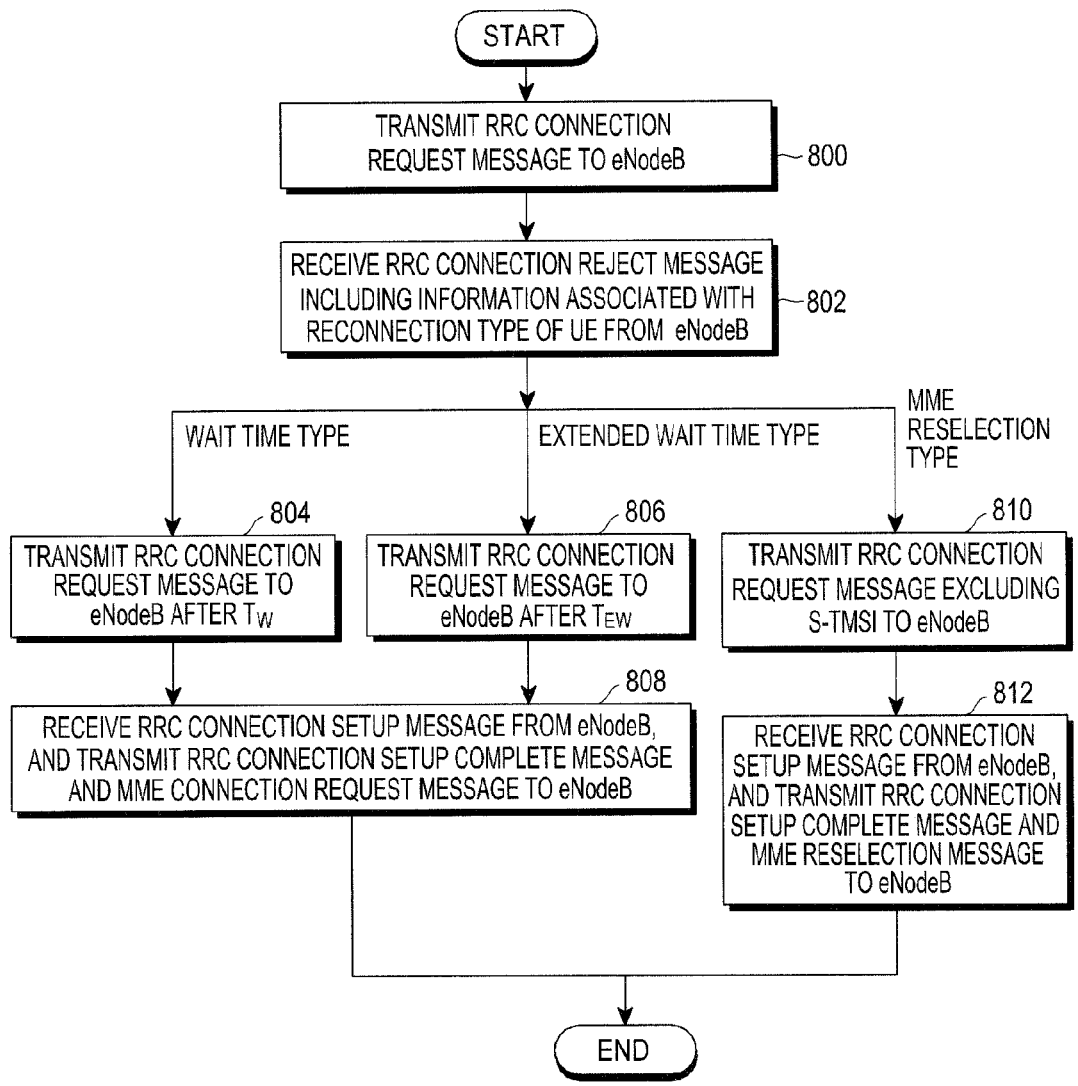
FIG. 8 is a flowchart illustrating a process of operations of a UE according to an embodiment of the present disclosure.

FIG. 8 is a flowchart illustrating a process of operations of a UE according to an embodiment of the present disclosure.

Referring to FIG. 8, a UE transmits an RRC connection request message to an eNodeB in operation 800. The RRC connection request message includes message type information and an identifier of the UE assigned from an Old MME, that is, an S-TMSI.

When an overload occurs in the Old MME, the UE receives, from the eNodeB, an RRC connection reject message including information associated with a reconnection type of the UE in operation 802. When the reconnection type of the UE is a wait time type, the UE proceeds with operation 804 and transmits an RRC connection request message to the eNodeB after $T_W$. When the reconnection type of the UE is an extended wait time type, the UE proceeds with operation 806 and transmits an RRC connection request message to the eNodeB after $T_{EW}$. Here, when the overload state of the Old MME does not end after $T_W$ (when the reconnection type of the UE is the wait time type) or $T_{EW}$ (when the reconnection type of the UE is the extended wait time type), the UE receives an RRC connection reject message from the eNodeB. More specifically, the reconnection request of the UE is rejected.

When the overload state of the Old MME ends after $T_W$ or $T_{EW}$, the UE receives an RRC connection setup message from the eNodeB and transmits an RRC connection setup complete message and an MME connection request message to the eNodeB in operation 808.

When the reconnection type of the UE is the MME reselection type, the UE transmits an RRC connection request message excluding an S-TMSI to the eNodeB in operation 810. The UE receives an RRC connection setup message from the eNodeB, and transmits an RRC connection setup complete message and an MME reselection message to the eNodeB in operation 812. GUMMEI may not be included in the RRC connection setup complete message, and timer information may be included in the MME reselection message. The UE transmits the MME reselection message and is registered with a New MME for communication.

Hereinafter, a configuration of an MME according to an embodiment of the present disclosure will be described with reference to FIG. 9.

Figure 9:
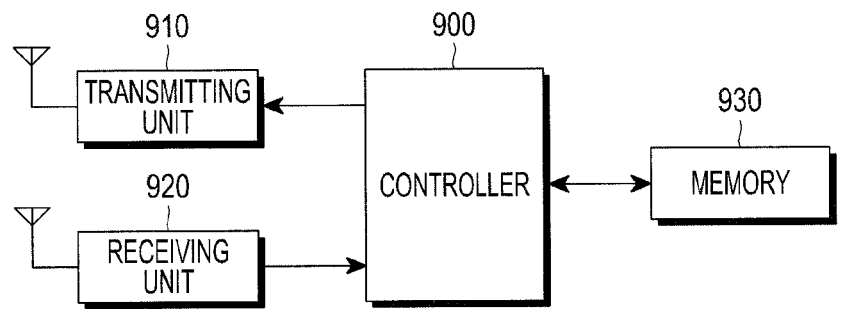
FIG. 9 is a block diagram of an MME for controlling a connection of a UE according to an embodiment of the present disclosure.

FIG. 9 is a block diagram of an MME for controlling a connection of a UE according to an embodiment of the present disclosure.

Referring to FIG. 9, the MME includes a controller 900, a transmitting unit 910, a receiving unit 920, and a memory 930.

The controller 900 controls the transmitting unit 910, the receiving unit 920, and the memory 930, so as to control general operations of the MME.

According to an embodiment of the present disclosure, the controller 900 predicts a length of an overload duration when an overload occurs. The controller 900 determines one of a wait time type, an extended wait time type, and an MME reselection type to be a reconnection type of a UE, based on the length of the overload duration.

The controller 900 controls the transmitting unit 910 to include information associated with the determined reconnection type of the UE in an overload start message, and to transmit the same to an eNodeB. Here, the determined reconnection type of the UE is the MME reselection type, timer information may be included.

When the determined reconnection type of the UE is the wait time type, the controller 900 executes an operation for the reconnection of the UE in response to a connection request of the UE transmitted after $T_W$. When the determined reconnection type of the UE is the extended wait time type, the controller 900 executes an operation for the reconnection of the UE in response to a connection request of the UE transmitted after $T_{EW}$.

In addition, when the reconnection type of the UE is the MME reselection type, the controller 900 deletes context information of the UE based on timer information or based on whether an overload state of the MME ends. More particularly, when the reconnection type of the UE is the MME reselection type that uses the timer information, the controller 900 determines whether the overload state ends. When the overload state ends, the controller 900 controls the transmitting unit 910 to transmit, to the eNodeB, a message indicating that the overload state ends. Subsequently, when the receiving unit 920 receives a request for deleting the context information of the UE from the HSS as a timer associated with the timer information expires, the controller 900 deletes the context information of the UE.

When the reconnection type of the UE is the MME reselection type that does not use the timer information, the controller 900 determines whether the overload ends. When the overload ends, the controller 900 controls the transmitting unit 910 to transmit a message indicating that the overload ends, to the eNodeB and the HSS. Thereafter, when the receiving unit 920 receives a request for deleting the context information of the UE from the HSS, the controller 900 deletes the context information.

The transmitting unit 910 transmits the overload start message to the eNodeB, based on a control of the controller 900. The transmitting unit 910 transmits a message indicating that the overload ends to the eNodeB and the HSS, based on a control of the controller 900.

The receiving unit 920 receives a request for deleting the context information of the UE from the HSS, as a timer expires. The memory 930 stores the context information of the UE and the information associated with the determined reconnection type of the UE, based on a control of the controller 900. In addition, the memory 930 stores information generated during communication made with the eNodeB and the UE, based on a control of the controller 900.

Hereinafter, a configuration of an eNodeB according to an embodiment of the present disclosure will be described with reference to FIG. 10.

Figure 10:
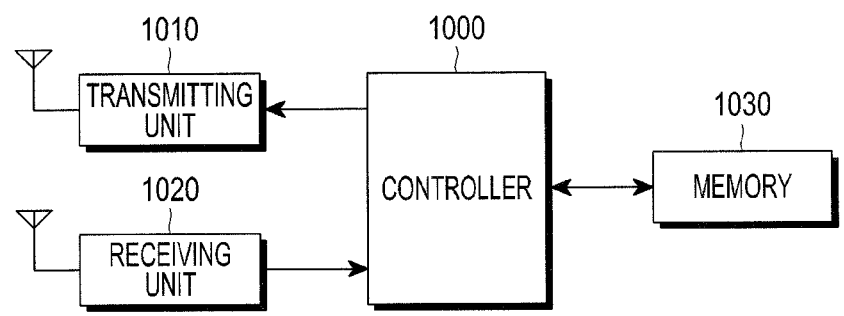
FIG. 10 is a block diagram of an eNodeB for controlling a connection of a UE according to an embodiment of the present disclosure.

FIG. 10 is a block diagram of an eNodeB for controlling a connection of a UE according to an embodiment of the present disclosure.

Referring to FIG. 10, the eNodeB includes a controller 1000, a transmitting unit 1010, a receiving unit 1020, and a memory 1030.

The controller 1000 controls the transmitting unit 1010, the receiving unit 1020, and the memory 1030, so as to control general operations of the eNodeB.

In an embodiment of the present disclosure, the controller 1000 receives, from an Old MME that managed a context of a UE, an overload start message including information associated with a reconnection type of the UE through the receiving unit 1020. The controller 1000 determines whether an RRC connection request message is received from the UE.

When the RRC connection request message is received, the controller 1000 controls the transmitting unit 1010 to transmit, to the UE, an RRC connection reject message including information associated with the reconnection type of the UE. Here, when the reconnection type of the UE is an MME reselection type, the controller 1000 may include timer information in the RRC connection reject message.

When the reconnection type of the UE is a wait time type, the controller 1000 receives the RRC connection request message from the UE after $T_W$ which is a waiting time. When it is determined that an overload of the Old MME is not removed after $T_W$, the controller 1000 transmits the RRC connection reject message to the UE so as to continuously block the connection of the UE.

When the reconnection type of the UE is an extended wait time type, the controller 1000 receives an RRC connection request message from the UE after $T_{EW}$ which is a waiting time. Here, when it is determined that the overload of the Old MME is not removed after $T_{EW}$, the controller 1000 transmits an RRC connection reject message to the UE so as to continuously block the connection of the UE. When it is determined that the overload of the old MME is removed after $T_W$ (in the case of the wait time type) or $T_{EW}$ (in the case of the extended wait time type), the controller 1000 controls the transmitting unit 1010 to transmit an RRC connection setup message to the UE, and receives an RRC connection setup complete message and an MME connection request message from the UE through the receiving unit 1020. The controller 1000 controls the transmitting unit 1010 to transfer the MME connection request message to the Old MME so that the UE connects to the Old MME.

When the reconnection type of the UE is the MME reselection type, the controller 1000 receives an RRC connection request message excluding an S-TMSI through the receiving unit 1020. The controller 1000 controls the transmitting unit 1010 to transmit an RRC connection setup message to the UE, and receives an RRC connection setup complete message and an MME reselection message transmitted from the UE through the receiving unit 1020. GUMMEI may not be included in the RRC connection setup complete message, and timer information may be included in the MME reselection message.

Subsequently, the controller 1000 controls the transmitting unit 1010 to transfer the MME reselection message to a New MME so that the UE selects another MME which is not overloaded as the New MME and the UE connects to the New MME. When the receiving unit 1020 receives an overload stop message indicating that the overload state ends from the Old MME, the controller 1000 cancels blocking the connection of the UE to the Old MME.

The transmitting unit 1010 transmits an RRC connection reject message and an RRC connection setup message to the UE, based on a control of the controller 1000. The transmitting unit 1010 transfers an MME connection request message to the Old MME and transfers an MME reselection message to the New MME, based on a control of the controller 1000.

The receiving unit 1020 receives, from the UE, an RRC connection request message, an RRC connection setup complete message, and an MME connection request message, and an MME reselection message.

The memory 1030 stores information generated during communication, including information associated with a reconnection type of the UE and the like, made with the Old MME, the New MME, and the UE, based on a control of the controller 1000.

Hereinafter, a configuration of a UE according to an embodiment of the present disclosure will be described with reference to FIG. 11.

Figure 11:
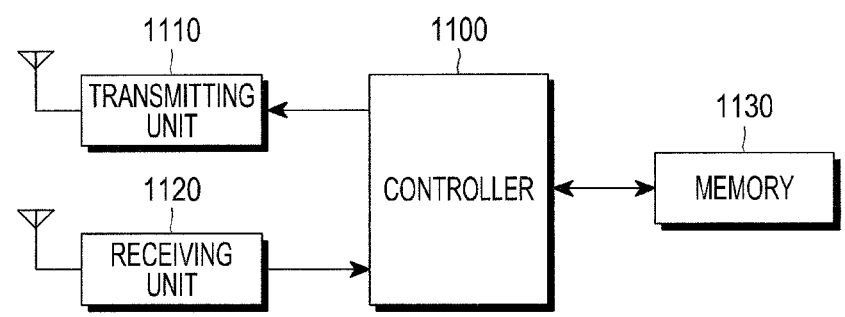
FIG. 11 is a block diagram of a UE according to an embodiment of the present disclosure.

FIG. 11 is a block diagram of a UE according to an embodiment of the present disclosure.

Referring to FIG. 11, the UE includes a controller 1100, a transmitting unit 1110, a receiving unit 1120, and a memory 1130.

The controller 1100 controls the transmitting unit 1110, the receiving unit 1120, and the memory 1130, so as to control general operations of the UE.

In an embodiment of the present disclosure, the controller 1100 controls the transmitting unit 1110 to transmit an RRC connection request message to an eNodeB. The RRC connection request message includes message type information and an identifier of the UE assigned from an Old MME, that is, an S-TMSI.

When an overload occurs in the Old MME, the controller 1100 receives, through the receiving unit 1120 from the eNodeB, an RRC connection reject message including information associated with a reconnection type of the UE. When the reconnection type of the UE is a wait time type, the controller 1100 controls the transmitting unit 1110 to transmit an RRC connection request message to the eNodeB after $T_W$. When the reconnection type of the UE is an extended wait time type, the controller 1100 controls the transmitting unit 1110 to transmit an RRC connection request message to the eNodeB after $T_{EW}$.

Here, when the overload state of the Old MME does not end after $T_W$ (when the reconnection type of the UE is the wait time type) or $T_{EW}$ (when the reconnection type of the UE is the extended wait time type), the UE receives an RRC connection reject message from the eNodeB.

When the overload state of the Old MME ends after $T_W$ or $T_{EW}$, the controller 1100 receives, through the receiving unit 120, an RRC connection setup message from the eNodeB and controls the transmitting unit 1110 to transmit an RRC connection setup complete message and an MME connection request message to the eNodeB.

When the reconnection type of the UE is the MME reselection type, the controller 1100 controls the transmitting unit 1110 to transmit an RRC connection request message excluding an S-TMSI to the eNodeB. The controller 1100 receives an RRC connection setup message through the receiving unit 1120 from the eNodeB, and controls the transmitting unit 1120 to transmit an RRC connection setup complete message and an MME reselection message to the eNodeB. GUMMEI may not be included in the RRC connection setup complete message, and timer information may be included in the MME reselection message. The controller 1100 transmits the MME reselection message and is registered with a New MME for communication.

The transmitting unit 1110 transmits, to the eNodeB, an RRC connection request message, an RRC connection setup complete message, and MME connection request message, and an MME reselection message, based on a control of the controller 1100. The receiving unit 1120 receives, from the eNodeB, an RRC connection reject message and an RRC connection setup message.

The memory 1130 stores information generated during communication, including information associated with a reconnection type of the UE and the like, made with the Old MME, the New MME, and the eNodeB, based on a control of the controller 1100.

Hereinafter, simulation results obtained when a reconnection type of a UE is used according to an embodiment of the present disclosure will be described with reference to FIGS. 12A and 12B.

Figure 12A:
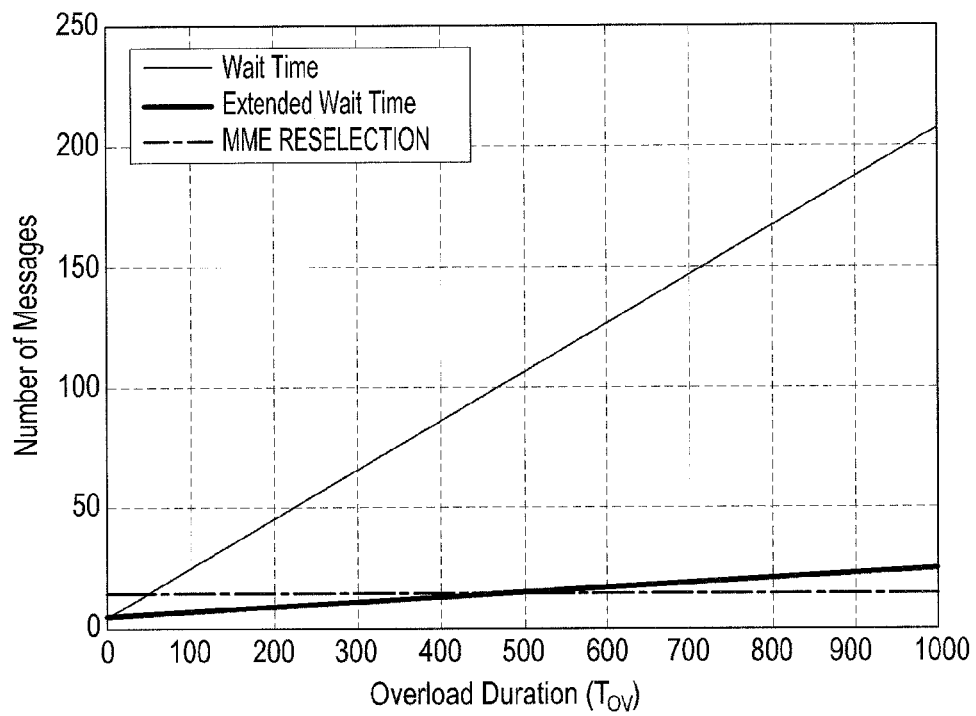
FIGS. 12A and 12B illustrate simulation results obtained when a reconnection type of a UE is used according to an embodiment of the present disclosure.
Figure 12B:
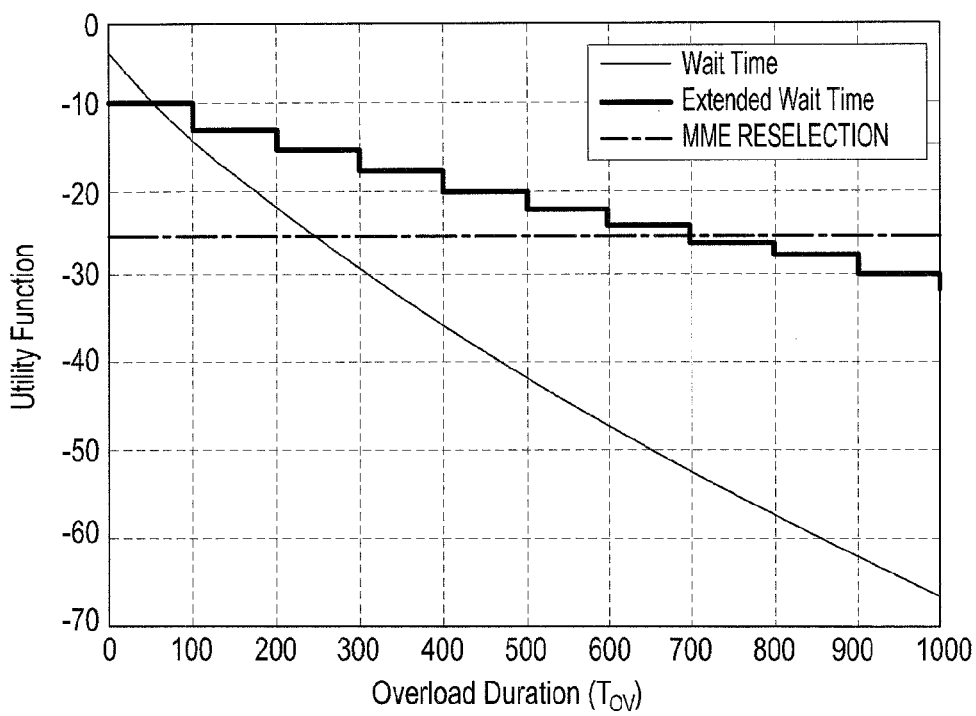

FIGS. 12A and 12B illustrate simulation results when a reconnection type of a UE is used according to an embodiment of the present disclosure.

Referring to FIG. 12A, a number of messages needed based on a length of an overload duration of an MME for each reconnection type of a UE is illustrated.

The number of messages needed based on the length of the overload duration of the MME for each reconnection type of the UE may be calculated using Equation 2.

$$N_W = 2 + 2\left\lceil \frac{T_{OV}}{T_W} \right\rceil + 3$$

$$N_{EW} = 2 + 2\left\lceil \frac{T_{OV}}{T_{EW}} \right\rceil + 3$$

$$N = 2 + N_{CN} + 3$$

Equation 2

In Equation 2, $N_W$ denotes the number of messages for a wait time type, NEW denotes the number of messages for an extended wait time type, and N denotes the number of messages for a MME re-selection type. Toy denotes the length of an overload duration, $T_W$ denotes a value of a waiting time used when a wait time type is used, $T_{EW}$ denotes a value of an extended waiting time used when an extended wait time type is used, and $N_{CN}$ denotes the number of messages additionally used in a core network.

The change in the number of messages based on the length of the overload duration, obtained using Equation 2, is as shown in FIG. 12A. As illustrated in FIG. 12A, when the wait time type is used, as the length of the overload duration of the MME increases, the number of messages rapidly increases. When the extended wait time type is used, as the length of the overload duration of the MME increases, the number of messages (for example, the number of messages for RRC connection) relatively gently increases when compared to the wait time type. When the MME reselection type is used, the number of messages does not change although the length of the overload duration of the MME increases.

Meanwhile, a wasted time for each reconnection type of the UE may be calculated using Equation 3. Here, the wasted time indicates an amount of wasted time in which the connection of a UE fails due to access barring even through the connection of the UE is allowed. More specifically, the wasted time indicates a period of time between a point of transmitting an overload stop message and a point of transmitting the RRC connection request message. For example, the wasted time may be calculated using Equation 3.

$$\tau_W = T_W/2$$

$$\tau_{EW} = T_{EW}/2$$

$$\tau = \text{given value} \qquad \text{Equation 3}$$

In Equation 3, $\tau_W$ denotes an amount of wasted time when a wait time type is used, and $\tau_{EW}$ denotes an amount of wasted time when an extended wait time type is used. In addition, $\tau$ denotes an amount of wasted time when an MME reselection type is used. $\tau$ may be variably set based on a selected MME.

As described above, when an amount of wasted time is calculated for each reconnection type of the UE, the capability for each reconnection type of the UE may be calculated based on the calculated wasted time and the number of messages obtained using Equation 2. For example, the capability for each reconnection type of the UE may be calculated using Equation 4 that uses a Cobb-Douglas Utility Function.

$$U(N,\tau) = -N^{\alpha} \cdot \tau^{(1-\alpha)} \qquad \text{Equation 4}$$

In Equation 4, N denotes the number of messages, and $\tau$ denotes an amount of wasted time.

When a capability for each reconnection type of a UE is charted on a graph based on a length of an overload duration using Equation 4, it is as shown in FIG. 12B.

Referring to FIG. 12B, when the wait time type is used, the capability deteriorates as the length of the overload duration becomes longer. When the extended wait time type is used, the capability relatively gently deteriorates when compared to the wait time type.

As described above, when the wait time type and the extended wait time type are used, the capability deteriorates as the length of the overload duration increases. However, when the MME reselection type is used, deterioration in capability does not occur irrespective of the length of the overload duration.

The reconnection types of the UE that are provided in various embodiments of the present disclosure are as follows.

First, when the wait time type is used, the amount of wasted time for the connection may be minimized but the number of messages may increase due to frequent reconnection attempts, that is, a high number of RRC connection requests.

When the extended wait time type is used, the number of messages is relatively smaller when compared to the wait time type but a waiting time is longer than the wait time type.

In addition, when the MME reselection type is used, RRC connection may be promptly executed but an additional load on a core network may occur.

Therefore, an embodiment of the present disclosure takes into consideration strong and weak points of the above described reconnection types of the UE, and determines one that may be effectively utilized based on the length of an overload duration, from among the reconnection types of the UE.

Hereinafter, simulation results obtained when a wait time type and an MME reselection type are used will be described with reference to FIGS. 13A and 13B.

Figure 13A:
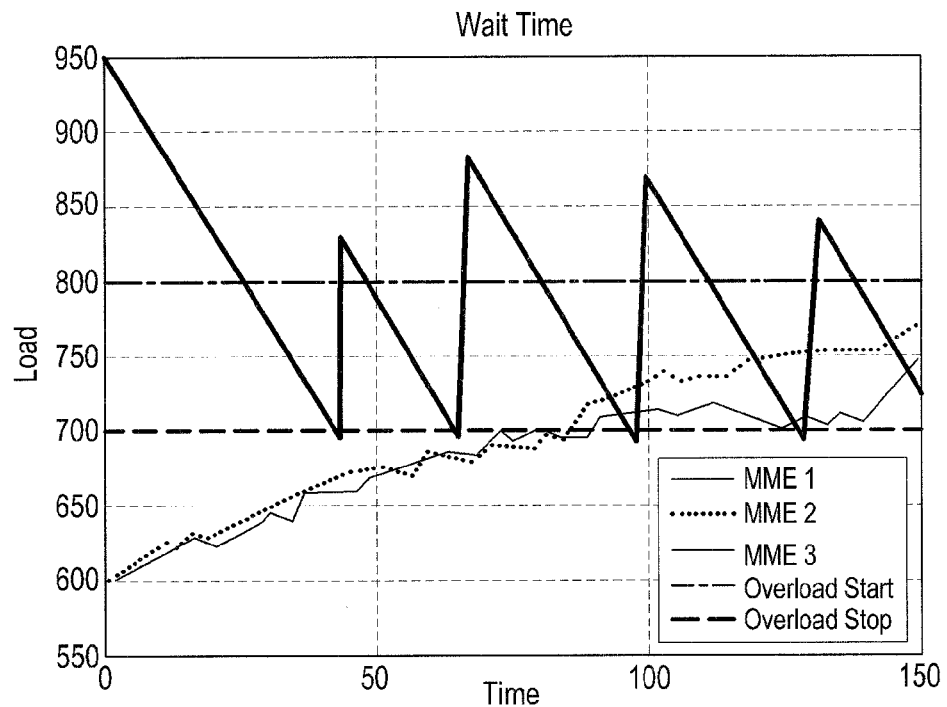
FIGS. 13A and 13B illustrate simulation results obtained when a wait time type and an MME reselection type are used according to an embodiment of the present disclosure.
Figure 13B:
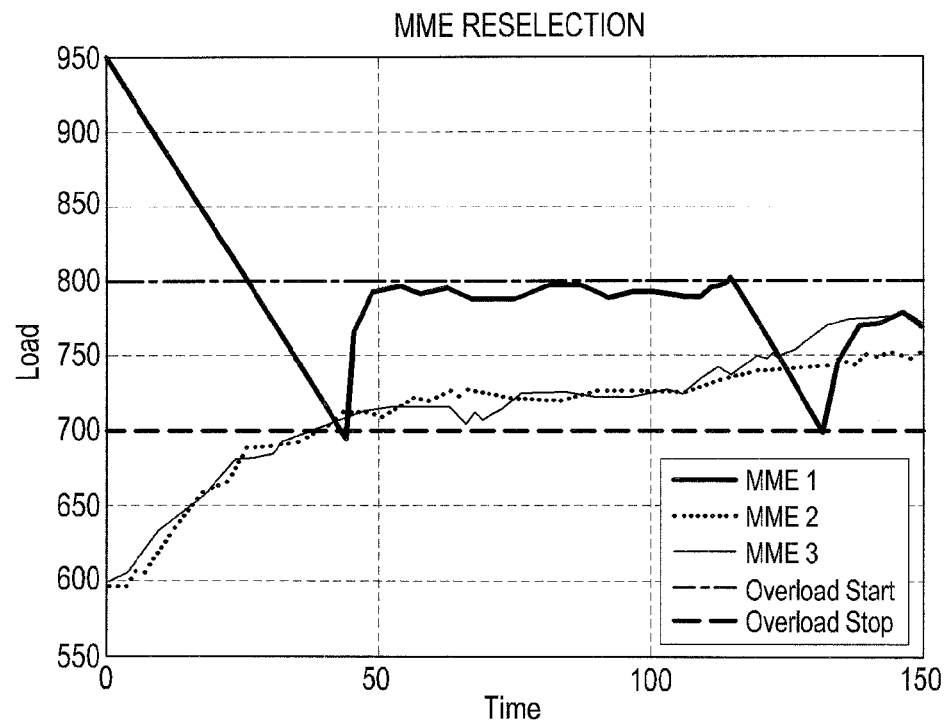

FIGS. 13A and 13B illustrate simulation results obtained when a wait time type and an MME reselection type are used according to an embodiment of the present disclosure are used.

Results of the simulation executed under the assumption of the following items in order to determine capabilities of the wait time type and the MME reselection type has been shown in FIGS. 13A and 13B.

a mobile communication system includes an eNodeB and three MMEs (that is, MME1 through MME3)
  an overload occurs in MME1 (occurrence of an overload is determined based on the number of RRC-connected UEs)
  the length of the overload duration is predicted by assuming an MME to be a queue
  Queue Model
  Input Rate=Dedicated Traffic+Initial Traffic (NNSF)
  Output Rate=Deterministic Service Time
  MME reselection time=20*$T_W$ Referring to FIG. 13A, it illustrates an amount of load of each MME when the wait time type is used. As shown in FIG. 13A, when the wait time type is used, the number of overloads occurring in the MME1 is not reduced.

Referring to FIG. 13B, when the MME reselection type is used, the load amount of MME1 is decreased to be less than or equal to a threshold value used for determining an overload (overload start) from when an MME is reselected, and the overload of the MME1 is removed.

As described above, use of the MME reselection type prevents RRC-rejected UEs from being concentrated into a single MME, and the number of overloads occurring in the corresponding MME may be reduced. In addition, when the MME reselection type is used, an amount of load may be promptly dispersed into other MMEs where an overload state does not exist and, thus, a UE may promptly execute reconnection.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for a Mobility Management Entity (MME) to control a connection of a User Equipment (UE) in a mobile communication system, the method comprising:
  predicting a length of an overload duration when an overload occurs;
  determining one of a plurality of reconnection types to be a reconnection type of the UE, based on the predicted length of an overload duration; and
  transmitting, to an evolved Node B (eNodeB), information associated with the determined reconnection type of the UE,
  wherein the plurality of reconnection types comprises a first wait time type in which the UE attempts reconnection to the MME after a first waiting time set in advance, a second wait time type in which the UE attempts reconnection to the MME after a second waiting time which is longer than the first waiting time, and an MME reselection type in which the UE attempts to connect to another MME that is different from the MME.

2. The method of claim 1, wherein the predicting of the length of the overload duration comprises:
predicting the length of the overload duration based on a number of connected UEs.

3. The method of claim 1, wherein the determining of one of the plurality of reconnection types to be the reconnection type of the UE comprises:
determining one of the plurality of reconnection types to be the reconnection type of the UE, based on at least two threshold values determined using the first waiting time, the second waiting time, and a maximum permissible number of reconnections determined in advance for the UE.

4. The method of claim 1, wherein the transmitting, to the eNodeB, of the information associated with the determined reconnection type of the UE comprises:
when the determined reconnection type of the UE is the MME reselection type, transmitting, to the eNodeB, timer information used for determining a point in time when context information of the UE is deleted by the MME, together with the information associated with the determined reconnection type of the UE.

5. The method of claim 4, wherein, when a timer associated with the timer information expires and a message that instructs deletion of the context information of the UE is received from a Home Subscriber Server (HSS), the method further comprises:
deleting the context information of the UE.

6. The method of claim 1, further comprising:
transmitting, to a Home Subscriber Server (HSS), a message indicating that the overload has ended when the overload ends; and
deleting context information of the UE when a message instructing deletion of the context information of the UE is received from the HSS.

7. A method for an evolved Node B (eNodeB) to control a connection of a User Equipment (UE) in a mobile communication system, the method comprising:
receiving information associated with a reconnection type of the UE from a Mobility Management Entity (MME) in which an overload occurs; and
including the information associated with the reconnection type of the UE in a connection request reject message and transmitting the connection request reject message to the UE when a first connection request message is received from the UE,
wherein the reconnection type of the UE is one of a first wait time type in which the UE attempts reconnection to the MME after a first waiting time set in advance, a second wait time type in which the UE attempts reconnection to the MME after a second waiting time which is longer than the first waiting time, and an MME reselection type in which the UE attempts to connect to another MME that is different from the MME.

8. The method of claim 7, wherein the receiving of the information associated with the reconnection type of the UE comprises:
when the reconnection type of the UE is the MME reselection type, receiving, from the MME, timer information used for determining a point in time when context information of the UE is deleted by the MME, together with the information associated with the determined reconnection type of the UE.

9. The method of claim 8, wherein the including of the information associated with the reconnection type of the UE in the connection request reject message and the transmitting of the connection request reject message to the UE comprises:
when the first connection request message is received from the UE, including the information associated with the reconnection type of the UE and the timer information in the connection request reject message and transmitting the connection request reject message to the UE.

10. The method of claim 8, further comprising:
transmitting a connection setup message to the UE when a second connection request message is received that excludes an identifier of the UE assigned by the MME; and
transferring an MME connection request message to another MME that is different from the MME when a connection setup complete message that excludes MME identification information and an MME connection setup request message comprising MME reconnection information are received from the UE.

11. A Mobility Management Entity (MME) connection method for a User Equipment (UE) to connect to an MME in a mobile communication system, the method comprising:
transmitting a first connection request message to an evolved Node B (eNodeB), and receiving a connection request reject message comprising information associated with a reconnection type of the UE from the eNodeB; and
connecting to the MME or another MME that is different from the MME, based on the reconnection type of the UE comprised in the connection request reject message,
wherein the reconnection type of the UE is one of a first wait time type in which the UE attempts reconnection to the MME after a first waiting time, a second wait time type in which the UE attempts reconnection to the MME after a second waiting time which is longer than the first waiting time, and an MME reselection type in which the UE attempts to connect to another MME that is different from the MME.

12. The method of claim 11, wherein, when the reconnection type of the UE is the MME reselection type, the connection request reject message further comprises timer information used for determining a point in time when context information of the UE is deleted by the MME.

13. The method of claim 11, wherein the connecting to the MME or the other MME that is different from the MME, based on the reconnection type of the UE, comprises:
transmitting, to the eNodeB, a second connection request message excluding an identifier of the UE assigned by the MME when the reconnection type of the UE is the MME reselection type; and
transmitting, to the eNodeB, a connection setup complete message excluding MME identification information and an MME connection request message comprising MME reselection information when a connection setup message is received from the eNodeB.

14. The method of claim 10, wherein the MME connection request message comprises the timer information used for determining a point in time when context information of the UE is deleted by the MME.

15. An MME device configured to implement claim 1.

16. An eNodeB configured to implement claim 7.

17. A user equipment (UE) configured to implement claim 11.

* * * * *